(12) United States Patent
Maes

(10) Patent No.: US 10,691,010 B2
(45) Date of Patent: Jun. 23, 2020

(54) DIRECTION SELECTIVE PROJECTION DISPLAY SCREEN

(71) Applicant: BARCO NV, Kortrijk (BE)

(72) Inventor: Dirk Maes, Bissegem (BE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 16/302,856

(22) PCT Filed: May 22, 2017

(86) PCT No.: PCT/EP2017/062246
§ 371 (c)(1),
(2) Date: Nov. 19, 2018

(87) PCT Pub. No.: WO2017/198873
PCT Pub. Date: Nov. 23, 2017

(65) Prior Publication Data
US 2019/0294038 A1    Sep. 26, 2019

(30) Foreign Application Priority Data

May 20, 2016 (GB) .................................. 1608900.5

(51) Int. Cl.
*G03B 21/602* (2014.01)
*G03B 21/604* (2014.01)
(Continued)

(52) U.S. Cl.
CPC .......... *G03B 21/602* (2013.01); *G03B 21/10* (2013.01); *G03B 21/56* (2013.01); *G03B 21/58* (2013.01);
(Continued)

(58) Field of Classification Search
CPC ........ G03B 21/56; G03B 21/60; G03B 21/10; G03B 21/58; G03B 21/62
(Continued)

(56) References Cited

U.S. PATENT DOCUMENTS 2,362,573 A * 11/1944 MacNeille ........... G03B 21/604
359/455
3,295,910 A    1/1967 Hourdiaux
(Continued)

FOREIGN PATENT DOCUMENTS

| EP | 0689084 A1 | 12/1995 |
| WO | 2008141247 A1 | 11/2008 |
| WO | 2016069631 A1 | 5/2016 |

OTHER PUBLICATIONS

Schadt et al., Photo-Generation of Linearly Polymerized Liquid Crystal Aligning Layers Comprising Novel, Integrated Optically Patterned Retarders and Color Filters, Japanese Journal of Applied Physics, vol. 34 Jun. 1995, 11 pgs (Year: 1995).*

(Continued)

*Primary Examiner* — Clayton E. LaBalle
*Assistant Examiner* — Kevin C Butler
(74) *Attorney, Agent, or Firm* — Bacon & Thomas, PLLC

(57) ABSTRACT

A projection screen with micro lenses or micro mirrors for the purpose of suppressing ambient light by means of a patterned layer stack including at least a polarizer and a quarter wave retarder. The projection screen has a surface structure where light from a projector is focussed at positions where the light can escape from the structure and is optionally diffused. The location of the focus positions depends upon the incident angle of the light coming from the projector, and therefore the screen is tailored for a certain projector configuration and projector light direction.

23 Claims, 6 Drawing Sheets

(51) Int. Cl.

| | | |
|---|---|---|
| *G03B 35/20* | (2006.01) | |
| *H04N 9/31* | (2006.01) | |
| *G03B 21/60* | (2014.01) | |
| *G03B 21/10* | (2006.01) | |
| *G03B 21/58* | (2014.01) | |
| *G03B 21/62* | (2014.01) | |
| *G03B 21/56* | (2006.01) | |

(52) U.S. Cl.
CPC ........... *G03B 21/60* (2013.01); *G03B 21/604* (2013.01); *G03B 21/62* (2013.01); *G03B 35/20* (2013.01); *H04N 9/3147* (2013.01)

(58) Field of Classification Search
USPC .......................................................... 359/449
See application file for complete search history.

(56) References Cited

U.S. PATENT DOCUMENTS

| | | | | | |
|---|---|---|---|---|---|
| 3,704,055 | A * | 11/1972 | Hong | ................... | G03B 21/602 359/455 |
| 4,232,939 | A * | 11/1980 | Kikuchi | ............... | G03B 21/602 359/459 |
| 4,974,941 | A | 12/1990 | Gibbons et al. | | |
| 5,193,015 | A * | 3/1993 | Shanks | ................ | G02B 5/3016 348/E9.025 |
| 5,210,641 | A * | 5/1993 | Lewis | ................... | G03B 21/602 359/448 |
| 5,389,698 | A | 2/1995 | Chigrinov et al. | | |
| 5,658,490 | A * | 8/1997 | Sharp | ................. | G02F 1/13363 252/299.01 |
| 5,861,931 | A * | 1/1999 | Gillian | ................. | G02B 5/3016 349/129 |
| 6,449,089 | B1 * | 9/2002 | Moshrefzadeh | ..... | G03B 21/604 359/454 |
| 6,496,239 | B2 * | 12/2002 | Seiberle | ............... | G02B 5/3016 349/24 |
| 6,703,989 | B1 * | 3/2004 | Harrold | ............. | G02B 27/2214 345/32 |
| 6,765,640 | B1 * | 7/2004 | Acosta | ................. | G02F 1/13363 349/113 |
| 6,847,483 | B2 * | 1/2005 | Lippey | ................... | G03B 21/60 359/443 |
| 6,934,080 | B2 * | 8/2005 | Saccomanno | ........ | G02B 5/0242 359/437 |
| 7,262,912 | B2 * | 8/2007 | Wood | ..................... | G02B 3/005 359/443 |
| 7,471,352 | B2 * | 12/2008 | Woodgate | .......... | G02B 27/2214 349/57 |
| 7,515,336 | B2 * | 4/2009 | Lippey | ................. | G02B 5/0816 359/443 |
| 7,520,624 | B2 * | 4/2009 | Lippey | ................. | H04N 9/3114 353/85 |
| 7,561,336 | B2 * | 7/2009 | Osaka | ................. | H04N 5/7441 348/340 |
| 7,679,828 | B2 * | 3/2010 | Munro | ............ | B29D 11/00278 359/627 |
| 7,931,377 | B2 * | 4/2011 | Shinozaki | .............. | G03B 21/26 353/31 |
| 7,978,406 | B2 * | 7/2011 | Chuang | .................. | G03B 21/56 359/459 |
| 8,049,961 | B2 * | 11/2011 | Lin | ......................... | G03B 21/60 359/443 |
| 8,107,165 | B2 * | 1/2012 | Kageyama | ............ | G03B 21/60 359/459 |
| 8,704,984 | B2 * | 4/2014 | Chiou | ..................... | B32B 33/00 349/124 |
| 2003/0099808 | A1 | 5/2003 | Coyle et al. | | |
| 2003/0137626 | A1 * | 7/2003 | Khazova | .............. | G02B 27/285 349/117 |
| 2004/0105076 | A1 * | 6/2004 | Huber | .................... | G02B 27/26 353/20 |
| 2005/0231660 | A1 * | 10/2005 | Fujita | ................... | G02B 5/3083 349/98 |
| 2006/0109550 | A1 * | 5/2006 | Shimizu | ................. | G03B 21/10 359/457 |
| 2006/0126156 | A1 * | 6/2006 | Evans | ................... | G02F 1/1323 359/320 |
| 2006/0203332 | A1 * | 9/2006 | Shimotsuma | .......... | B29C 41/36 359/455 |
| 2008/0007813 | A1 * | 1/2008 | Wang | ...................... | G02B 5/28 359/245 |
| 2009/0103178 | A1 * | 4/2009 | Woodgate | ............. | G02B 27/26 359/465 |
| 2012/0229895 | A1 | 9/2012 | Shinbo et al. | | |
| 2014/0362331 | A1 * | 12/2014 | Shi | ..................... | G02F 1/13363 349/117 |
| 2016/0116834 | A1 * | 4/2016 | Candry | ............... | G03B 21/602 359/449 |
| 2016/0170110 | A1 * | 6/2016 | Pau | ....................... | G02B 5/3016 |
| 2017/0363472 | A1 * | 12/2017 | Abdulhalim | ......... | G02B 27/286 |

OTHER PUBLICATIONS

International Search Report for PCT/EP2017/062246, dated Aug. 22, 2017.
Written Opinion for PCT/EP2017/062246, dated Aug. 22, 2017.
Keyjia Wu; "Fabrication of micro-polarizer array with polymer thin film", Sunfest Technical Report TR-CST01DEC05, Center for Sensor Technologies, Dept of Electrical and Systems Eng, Univ. of Pennsylvania, Philadelphia, PA 2005, University of Pennsylvania Sunfest NSF REU Program Summer 2005, (Electrical and System Engineering, BS '06.
J. Lub, D. J. Broer, R. T. Wegh, E. Peeters, and B. M. I van der Zande, "Formation of Optical Films by Photo-Polymerisation of Liquid Crystalline Acrylates and Application of These Films in Liquid Crystal Display Technology", Molecular Crystals and Liquid Crystals vol. 429 , Iss. 1,2005, in section 2.2.
International Preliminary Report on Patentability for PCT/EP2017/062246, dated Nov. 20, 2018.

* cited by examiner

DIRECTION SELECTIVE PROJECTION DISPLAY SCREEN

The present invention relates to a projection screen with suppressed ambient light reflection and also relates to a projector and a projection system for use with the screen as well as to methods of projection and viewing and of making such a projection screen. In particular, the present invention relates to multiscreen projection or multi-projector systems such as used in theatres, cinemas, artificial reality systems and simulators.

BACKGROUND OF THE INVENTION

Nowadays images can be projected onto a screen or viewed directly on large displays such as LED or LCD displays, e.g. for home theatre applications. The contrast in a highly lit environment is one of the advantages of a display like an LCD. Projection systems on the other hand offer larger screens with a lower weight and ease of installation. Hence, to improve the performance of projection system it would be preferred to reduce the reflections of ambient light falling onto the screen.

Where multiple screens or curved screens are used in projection system, cross-screen reflections can occur, e.g. in simulation setups or in an immersive screen setup like the Barco Escape™ format for cinema.

But also when there is only a single projection screen in use in a nearly dark (for example cinema) environment, the contrast level of the projected image is affected by light returning via the walls, ceiling, floor and seats (e.g. with or without audience). In addition, national regulations may demand exit lights in the theatre to be visible all of the time. To achieve high dynamic range projection, these issues need to be tackled.

A projector screen with micro lenses or micro mirrors for the purpose of suppressing ambient light by means of a polarizer and quarter wave retarder, while focussing the light from a projector at a position where the light can escape from the structure and is optionally diffused is known (WO2016069631A1). A difficulty with this arrangement is that the position of the focus points depends upon the incident angle of the light coming from the projector, and therefore the screen has to be tailored for a certain projector configuration.

One dimensional structures could be used for the micro lenses or micro mirrors as these could simplify the production process. However one dimensional structures also have disadvantages. The acceptance of ambient light is only restricted in 1 dimension. Secondly the operation of the screen is symmetrical: all the light from the projector is scattered into the environment, all the light from the environment (that enters through the focus point) is returned towards the projector. With a 2 dimensional structure, if the projector is installed for the projected light beam not to be obstructed by the audience, the audience will not observe the ambient light entering through the focus point. With a one dimensional structure the light will return to the projector as a strip, and therefore a vertical lenticular structure will not work if the projector is behind the audience. As part of the light returning as a vertical strip will be picked up by the eyes of the audience, and a vertical band in the image will show degraded contrast performance. Only a horizontal lenticular structure could be considered in this case.

Methods to create micro-patterned anisotropic thin film layers such as retarders and polarizers have been developed based on photo-alignment technology. In a first step a Linear Photo Polymer (LPP) layer is applied on the substrate using a suitable coating technique after which the layer is dried at high temperature. A preferred alignment direction is induced in this layer by irradiation with linearly polarized light of an appropriate (UV or parts of the visible spectrum) wavelength. Liquid crystals in contact with a surface thus irradiated are oriented in accordance with this preferred direction. U.S. Pat. No. 4,974,941 describes such a photo-alignment method, that is reversible, by further irradiation of the layer with a second polarization direction, the alignment direction can be turned. U.S. Pat. No. 5,389,698 describes a photo-alignment layer that is non-rewritable.

When using the rewritable photo-alignment material and masking part of the surface during the second irradiation a patterned alignment can be achieved. Alternatively when a polarization pattern is applied to the illumination also with the non-rewritable photo-alignment layer a patterned alignment structure can be achieved.

Covering such a photo-alignment layer with a Liquid Crystal Polymer (LCP) layer, after which the layer is dried, annealed and UV-cross-linked enables the production of thin film anisotropic components such as retarders, as described in EP 0689084. The alignment and the layer thickness can be controlled to achieve the desired retardation. As such micro-structured retarders can be created. These processes have been successfully applied to create film patterned retarders for use in 3D TV sets. The process and the application for film patterned retarders are well described in the brochure for reactive mesogens from Merck.

The advantage of the photoalignment method is that it is a contact free method and multiple LPP/LCP layers can be applied on top of each other. Achromatic broadband retardance can be achieved by combining two planar LCP retarder layers. Further the angular dependency of the retarder can be reduced by using a bi-axial retarder (e.g. by stacking a C-axis retarder layer on top of a planar retarder layer).

By adding dichroic dyes to the LCP layer it is possible to create and pattern polarizer components. A process to create micro-polarizers has been described in U.S. Pat. No. 6,496,239.

SUMMARY OF THE INVENTION

The present invention relates to a projection screen with suppressed ambient light reflection and also relates to a projector and a projection system for use with the screen as well as to methods of projection and viewing and of making such a projection screen. In particular, the present invention relates to multiscreen projection systems such as used in theatres, cinemas artificial reality systems and simulators. The projection screens are reflective screens. Projection display screens in accordance with embodiments of the present invention take full advantage of High Dynamic Range projection. Even in a dark room such as a cinema room, if the images have an average brightness level, light reflections from the projection screen to the wall or walls, floor and ceiling and back onto the projection screen as well as emergency lighting define the black level. So contrast is defined by ambient light and not the projector. If the projector screen is curved, e.g. up to a 150° angle, especially between 120 and 150° curves, either horizontal, vertical or both, one side of the projector emits light onto the opposite side of the projector display screen such that this light increases the ambient light. Without the advantage of embodiments of the present invention if the projector is made brighter, what is gained gain in the white or light areas, is lost in in the black areas so that the dynamic range does not actually increase. Here is an advantage of embodiments or the present invention, a projection display screen that absorbs any ambient light such as coming from the walls, ceiling, floor, emergency lighting or from other parts of the projection screen.

In one aspect the present invention provides a reflective projection display screen having a surface structure and a screen area covered with a patterned layer stack, customized to accept projector light from one projection direction per projector, the projection display screen comprising:

a first retarder, a micro-lens array of mirrors for focussing light from at least one projector at focus positions where the light can escape from the patterned layer stack, a layer defining the patterned layer stack that is different at the focus positions than in the remainder of the screen area, and comprising a polarizing layer at least in said remainder of the screen area, wherein the patterned layer stack accepts only light coming from one projector direction per projector, whereas reflection of any light coming from another direction is reduced or suppressed.

The advantage is reduction or suppression of ambient light reflections thus providing High Dynamic Range projection.

The focus position of each of the micro-lens mirrors preferably coincides with a major surface of the patterned layer stack. This allows the light to exit the surface.

The micro-lens array of mirrors is preferably a pseudo random structure of micro-lens mirrors. A number of pseudo random micro-lens mirrors are positioned within the dimensions of a pixel of the projected image. This can help to reduce speckle and/or patterns of optical artefacts.

A diffuser can be located at the focus positions. The diffused light leaving the focus positions will provide a wide viewing angle. The diffuser located at the focus positions is a roughened surface of the substrate. This is a convenient way of making a diffuser.

Various layer can be provided in the layer stack such as the retarder being a quarterwave retarder, the polarizing layer being a micro-patterned polarizing layer, a second retarder formed on the photo-alignment layer, the second retarder being a broadband half-wave retarder, the polarizing layer being an etched polarizing layer, the first retarder being an etched broadband quarterwave retarder.

The layer defining the patterned layer stack is a photo-alignment layer. This has the advantages that materials and methods for such photo-aligning are available commercially.

The broadband half-wave retarder preferably provides a constant retardation over substantially the entire visible light wavelength range (420 nm-680 nm) or at least for all the wavelengths emitted by the projector. This allows a full gamut of colors to be displayed.

The screen can be adapted to receive polarized light from an ambient light source whose polarization differs from the polarization of light that can pass through the focus points. This will also prevent ambient light being reflected.

The substrate thickness is smaller than 3 times the diameter of a smallest micro-lens. This means that discrete viewing angles, for which the suppression of ambient light is not working, can be located outside the viewing angle range of interest.

A multiplication product of birefringence and thickness of the substrate is preferably 9 nm or less in order to maintain a polarization extinction ratio of at least 10:1 after a double pass of light through the substrate.

The projection display screen can operate with one or more projectors, the projection display screen being configured to accept projector light only from a projector direction of corresponding projectors dedicated to each projection display screen. This provides advantages in that addition projectors can provide additional functions, such a high-lighting, text such as subtitles, 3D displays etc. For example two or more projectors can project onto the same position on the projection screen and the projection screen at said position is configured to accept projector light only from projection directions of the two projectors.

For example, the two projectors can be a first and a second projector side by side that project with a certain overlap zone on the projection screen wherein a projected image gradually transitions from an image projected by the first projector to the image projected by the second projector in an edge blended projector setup, and the projection screen is configured to accept projector light only from projection directions of the first and the second projector. This provides advantages in that addition projectors can provide additional functions, such a highlighting, text such as subtitles, 3D displays etc.

The two projectors can be a first and a second projector side by side that project overlapped images to increase the brightness of the image on each projection screen, and the projection screen is configured to accept projector light only from projection directions of the first and the second projector.

The two projectors can be a first and a second projector side by side that project onto the projection screen overlapped images in order to generate a stereoscopic projection, and the projection screen is configured to accept projector light only from projection directions of the first and the second projector. This provides 3D images and videos, e.g. the first projector can be adapted to project the image with the left-eye information and the second projector can be adapted to project the image with the right-eye information.

The two projectors can be a first and a second projector side by side that project onto the projection screen a portion of the information of the image. This allows functions to be carried out in parallel. For example, the first projector can be adapted to project a background information and the second projector can be adapted to project a foreground information or the second projector can be adapted to project other additional information such as subtitles, highlights, or images of increased luminance for any reason.

In another aspect of the present invention, a plurality of projection display screens are provided as described above and these are used with a plurality of projectors units, each projection display screen being configured to accept projector light only from a projector direction of a corresponding projector unit dedicated to that projection display screen.

The plurality of screens can include at least a first projection display screen and a second projection display screen; wherein the first projection display screen can be at an angle with the second projection display screen. The screens being at angle means that light emitted from one screen can be ambient light for another part of the screen, but this type of ambient light is reduced or suppressed. This is also true if a third projection display screen is arranged at an angle with the third projection display screen.

Each of the plurality of projector units can be a multiple of projectors whereby the multiple projectors project onto the same position on each projection screen and each projection screen can be configured to accept projector light only from projection directions of the multiple projectors. Multiple projectors means provision of different functions.

Each projector unit can have a first and a second projector side by side that project with a certain overlap zone on the projection screen wherein a projected image gradually transitions from an image projected by the first projector to the image projected by the second projector in an edge blended projector setup, and each projection screen is configured to accept projector light only from projection directions of the first and the second projector. This provides blending with reflected ambient light reduction.

Each projector unit can have a first and a second projector side by side that project overlapped images to increase the brightness of the image on each projection screen or on one or more of the projection screens, and each projection screen is configured to accept projector light only from projection directions of the first and the second projector. This provides increased brightness with reflected ambient light reduction.

Each projector unit can have a first and a second projector side by side that project for each projection screen overlapped images in order to generate a stereoscopic projection, and each projection screen is configured to accept projector light only from projection directions of the first and the second projector. This provides 3D images or videos with reflected ambient light reduction. For example, the first projector can be adapted to project the image with the left-eye information and the second projector can be adapted to project the image with the right-eye information.

Each projector unit can have a first and a second projector side by side that project for each projection screen a portion of the information of the image. This provides increased functionality such as highlighting or subtitles with reflected ambient light reduction. An example is that the first projector can be adapted to project a background information and the second projector can be adapted to project a foreground information or the second projector can project other additional information such as subtitles, highlights, or images of increased luminance for any reason.

Each projector unit can have three or more projectors. This can enable 3D imaging and videos.

In a three screen arrangement the second projection display screen can be located between first and third projection display screens, for example a first projector can be arranged to project first images on the first projection display screen and a second projector can be arranged to project second images on the projection display second screen and a third projector can be arranged to project third images on the first projection display screen.

In another aspect a method of producing a projection display screen is disclosed, the screen having a screen area and a substrate, the projection display screen comprising: a first retarder, a micro-lens array of mirrors on the substrate for focussing light from a projector at focus positions where the light can escape from the substrate through a patterned layer structure, the method comprising the steps of:

covering the substrate with a photosensitive layer exposing the photosensitive layer to light from a light source, the light having an angle of incidence on the substrate identical to the angle of incidence of projector light projected from a projector onto that position on the screen, exposure of the photosensitive layer and subsequent processing steps defining a layer structure that is different at the focus positions, than in the remainder of the screen area. This has the advantage of providing High Dynamic Range display.

The photosensitive layer can be a photo alignment layer and subsequent processing can include the creation of a patterned polarizing layer wherein the polarization direction of the patterned polarizing layer is defined by the photo-alignment layer. Photo-alignment is a convenient process as commercially available materials and methods are available.

The photosensitive layer can be a photo alignment layer and subsequent processing can include the creation of a patterned broadband half-wave retarder wherein the retardation of the patterned half wave retarder layer for the incoming polarization direction is defined by the photo-alignment layer.

The photosensitive layer can be a positive photo resist layer and subsequent processing can include removing the exposed photo-resist at the focus points and etching away the underlying polarizing layer.

The photosensitive layer can be a positive photo resist layer and subsequent processing can include removing the exposed photo-resist at the focus points and etching away the underlying polarizing layer and broadband quarter wave retarder layer.

The light source can be a UV light source or a light source emitting at least a part of the visible spectrum. Such light sources are easily available.

A substrate thickness T is preferably smaller than a diameter of the micro-lens elements D (T<D), or (T<3D). This means that discrete viewing angles, for which the suppression of ambient light is not working, can be located outside the viewing angle range of interest. For example, a range of viewing angles of +/−30 degrees, the projection screen has viewing angles in the range of +30° to +90° and in the range of −90° to −30° where ambient light is not suppressed.

The micro-lens array of mirrors can be a pseudo-random or random array. This can reduce speckle or unwanted optical patterns. For example, the pseudo-random or random array or mirrors can comprise pseudo-random or random angles of optical axis, and/or sizes of micro-lens mirror elements, or random variations of spherical or aspherical shapes with different curvatures or diameters.

A plurality of projection display screen parts with increments of horizontal and/or vertical angle can be manufactured, the projection display screen being manufactured by patching together the projection display screen parts. This allows all sorts of shape of screen to be manufactured with reduced ambient reflections such as curved screens or half-domes.

The micro-lenses are created onto the substrate and the quarterwave retarder can be on a first major surface of the substrate facing away from the second major surface with the micro-lenses but the quarterwave retarder can also be on the same side of the substrate as the micro-lenses but below the reflective layer covering the micro-lenses. It is preferred if other layers are also applied to the first major surface of the substrate.

The substrate can be made of a rigid material such as glass but it is preferred to use a polymeric material such as polycarbonate or PET as this can result in a flexible screen of reduced weight. The substrate should show minimal birefringence, preferably the substrate does not show any birefringence. The retardation value (product of birefringence and thickness of the substrate) preferably is 9 nm or less in order to maintain a polarization extinction ratio of at least 10:1 after a double pass of the light through the substrate.

Embodiments of the present invention provide a projection display screen with a surface structure, micro lenses or micro mirrors for the purpose of suppressing ambient light by means of a polarizer and quarter wave retarder, while focussing the light from a projector at positions where the light can escape from the patterned layer stack and is optionally diffused. The location of the focus positions depends upon the incident angle of the light coming from the projector, and therefore the screen is tailored for a certain projector configuration and projector light direction.

The structure of the micro-lenses or micro-mirrors can be a regular structure or may have a pseudo random structure of micro-mirrors (or micro lenses) where lenses have different positions, optical axes, spherical or aspherical shapes, radii, and/or sizes but all focus the light on the front of the screen. The depth of the screen can be random, and the dimensions of the micro-mirrors (or micro-lenses) can be smaller than the size of a projected pixel, and this can help to reduce speckle.

DEFINITIONS

The term "broadband" when referring to a retarder used in any of the projection display screens according to any of the embodiments of the present invention refers to a retarder that has a substantially constant retardation over the entire visible wavelength range (e.g. 420 nm-680 nm). In some embodiments of the present invention the range is extended to cover a part or all of the UV (e.g. 280-340 nm) wavelength range. e.g. in the latter case the retarder has a substantially constant retardation value in both the UV (e.g. 280-340 nm) wavelength range and the visible range (e.g. 420 nm-680 nm).

DETAILED DESCRIPTION OF THE INVENTION

Embodiments of the present invention include a projection screen with micro lenses or micro mirrors for the purpose of suppressing ambient light by means of a patterned layer stack comprising at least a polarizer and a quarter wave retarder. Embodiments of the present invention also include a projector and a projection system and a method of projection.

Embodiments of the present invention provide a projection screen with a surface structure, comprising micro lenses or micro mirrors for the purpose of suppressing ambient light by means of a patterned layer stack comprising at least a polarizer and a quarter wave retarder, while focussing the light from a projector at positions where the light can escape from the patterned layer stack and is optionally diffused. The location of the focus positions depends upon the incident angle of the light coming from the projector, and therefore the screen is tailored for a certain projector configuration and projector light direction.

The structure of the micro-lenses or micro-mirrors can be a regular structure or may have a pseudo random structure of micro-mirrors (or micro-lenses) where lenses have different positions and sizes but all focus the light on the front of the screen.

Figure 7:
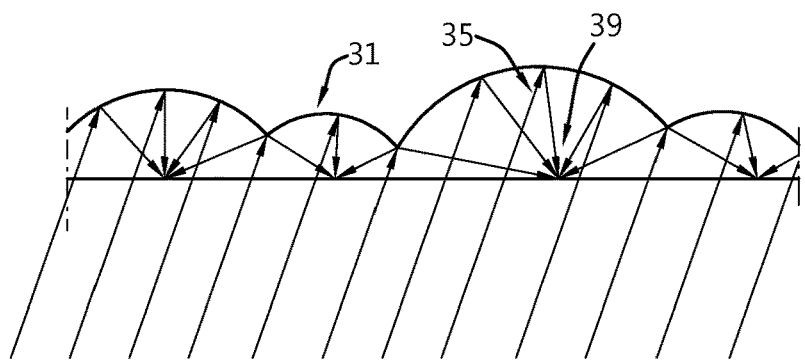
FIG. 7 illustrates a pseudo random arrangement of mirrors according to a further embodiment of the present invention.

Whereas it would be easier to manufacture a screen where the structure of the micro-lenses or micro-mirrors is a regular structure, such a regular structure is likely to interfere with the pixel structure of projected image and cause moiré patterns. Further a regular structure, would cause all the light reflected in the same direction (to the eye of the observer) to travel a similar distance, causing significant speckle, especially when laser illuminated projectors are used. It would therefore be preferable to use a pseudo random or random structure of micro-mirrors (or micro lenses) where individual micro-mirror elements (or microlens elements) have different positions and sizes, but all focus the light on the front of the screen. When also the depth of the screen is random, and the dimensions of the micro-mirrors (or micro-lenses) are smaller than the size of a projected pixel, this will help to reduce speckle. An example of such a screen structure is illustrated in FIG. 7. Embodiments of the present invention can work with a regular as well as a random or pseudo random structure of micro-mirrors (or micro-lenses).

Figure 1:
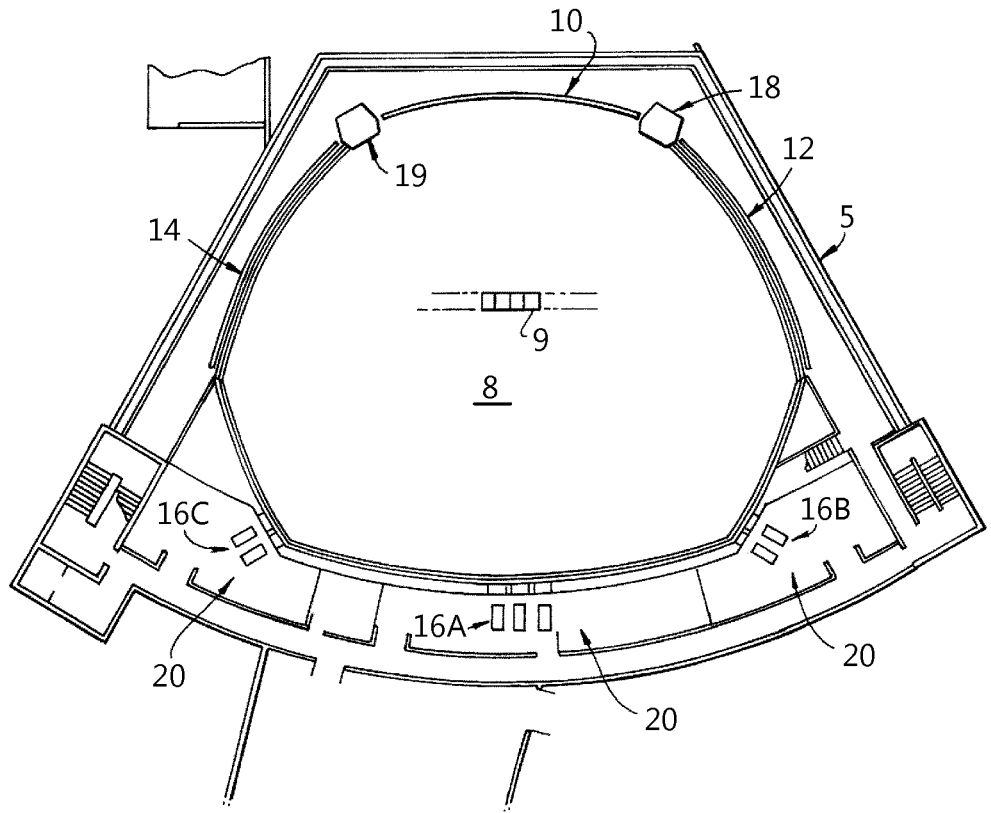
FIG. 1 illustrates a projection room or theatre, in which embodiments of the present invention can be used.

A projection room or theatre, in which embodiments of the present invention can be used, is shown in FIG. 1. A theater 5 is shown but the present invention may be used in other situations, e.g. for home theatres. The theater 5 has screens 10, 12, 14 facing an audience seating area 8 having seats 9. The screens includes a center projection screen 10 which can be straight or curved, a right projection screen 12 which can be straight or curved, and a left projection screen 14 which can be straight or curved. The right and left projection screens (12, 14) are positioned at an angle to the center projection screen 10. In a typical setup, the included angles between each of the side screens 12, 14 and the center projection screen 10 are approximately 90° to 120°, such that the projection zone can follow the contours of one side of a substantially rectangular theater. Some of the seats can be surrounded by the screens on three sides. The projection screens 10, 12, 14 can be flat or concave. Preferably, the screens 10, 12, 14 are flat.

The screens 10, 12, 14 can be jointed or not (i.e. with a gap between screens from a few millimeters to several meters or more). The gap between screens can be filled with one or more objects (e.g. columns or pillars 18 and 19) or with a spline screen or is empty. A spline screen is a narrow screen that extends over the same vertical dimension as screens on either side of it with the duty to fill in any space between the two neighboring screens. The spline screen is driven with a part of the video images which links the screens on either side of it.

In the back of the theater 5 are three or more projection rooms 20. In each projection room 20 are one or more film projectors 16A, 16B, 16C. As shown on FIG. 1, film projectors 16A project a portion of the film onto the center projection screen 10. Film projectors 16B project another portion of the film onto the left projection screen 14. Film projectors 16C project a third portion of the film onto the right projection screen 12. The projected images from the center projector 16A may abut or even overlap with the projected images from the side projectors 16B and 16C. In this manner, the film is presented to the audience in panorama. The objects projected onto the screens may move seamlessly from one screen to the next, making the film more realistic.

With conventional screens, with diffusion characteristics close to a Lambertian projection screen, some of the light projected by the side projector 16B on the left projection screen 14 will reach the center projection screen 10 and the right projection screen 12. Similarly, some of the light projected by the side projector 16C on the right projection screen 12 will reach the center projection screen 10 and the left projection screen 14. This will create visual artefacts, i.e. the visual content projected on one of the screen by the corresponding projector will appear to have been modified: the colors and light intensity viewed in the audience on one of the screen will not be those intended; the images can appear blurred and/or washed-out.

The amount of light that is reflected from one of the screens ("primary screen") to another one of the screens ("secondary screen") can be estimated, if certain assumptions are made about the screens. In the following example, the screen surfaces are assumed Lambertian and the included angle between the main screen and each side screen is 90°.

The incident light on the primary screen, which can be considered as being equal to the luminous power F of the projector divided by the image surface S, will be reflected in such a way that the luminance is the same from all viewing directions. In the case of reflectivity of the Lambertian type with unity gain, the luminance L can be determined in function of F:

$$L = F/(\pi S)$$

where L is expressed in cd/m², F is expressed in lumen, and S is expressed in m².

For a certain (small) white object with size dS projected on the primary screen, the luminous power $F_m$ in an area dA on the secondary screen, caused by the incidence of reflected light on that secondary screen, is given by:

$$d^2 F_m = \frac{F}{\pi S} \frac{\cos\theta \cos\varphi}{r^2} dS dA$$

where the light is reflected from the primary screen to the secondary screen under an angle theta (θ) from the normal of the primary screen, and arrives at the secondary screen under an angle phi (φ) from the normal of the secondary screen.

In a set-up with perpendicular screens, if "a" is the distance from the projected area away from the corner, and "b" is the distance on the secondary screen away from their intersect corner, one can derive that the illumination on the main screen is proportional to:

$$F_m \propto \frac{ba}{(b^2 + a^2)^2}$$

This means the illumination by the primary screen onto the secondary screen will be at its highest in an area not so far from the corner area. If the secondary screen is also a Lambertian screen, the reflection towards the audience will also be highest in this area close to the corner.

While the reflection of the image projected onto the primary screen towards the secondary screen does not produce a specular image on the latter, it is clear from the above that the main effect of the reflection will occur in a gradually delimited area of the secondary screen.

The most disturbing artefacts happen when there is a large difference in the brightness of images projected on at least two of the screens. If for instance, the image projected on the central screen is mainly dark and the image projected on one of the lateral screen contains one or more bright areas, the secondary reflection of those bright areas on the central screen will appear as a "ghost" or "glare". These cross-screen reflections can also occur in an immersive screen setup like the Barco Escape™ format for cinema.

The projectors 16A to 16C may each be multiple projectors whereby the multiple projectors project onto the same position on each projection screen. For example for each screen 2 projectors project side by side with a certain overlap zone where the image gradually transitions from the image projected by the first projector to the image projected by the second projector, e.g. with an edge blended projector setup. Or two projectors for each screen project overlapped images to increase the brightness of the image on each screen or on one or more of the screens. Alternatively, two projectors side by side project for each screen overlapped images in order to generate a stereoscopic projection. The first projector projects the image with the left-eye information the second projector projects the image with the right-eye information. Alternatively, two projectors are provided for each screen which project each a portion of the information of the image. The first projector can project a background information the second projector can project a foreground information, for example. Or the second projector can project other additional information such as subtitles, highlights, images of increased luminance for any reason. Each projector 16A to 16C may be three or more projectors, e.g. a red, a green and a blue projector, and optionally a further projector for a spot colour, for highlighting, etc.

Embodiments of the present invention provide a screen and projector system, with which any residual ambient light and secondary reflections can be reduced, e.g. largely absorbed and high dynamic range projection can be enabled without special measures towards the projection environment such as theatre construction.

Embodiments of the present invention provide a screen that can appear to be black, having a much improved image quality through projection, without special measures, for example to reduce ambient light, while the screen is still efficient in reflecting the light from the projector to the audience.

Such a projection system could be attractive for applications in meeting rooms, classrooms and public displays or for home theatre applications for example.

Even when there is little or no ambient light, embodiments of the present invention can provide a screen with significantly reduced cross-screen reflections in an immersive screen setup like the Barco Escape™ format for cinema or in simulation/artificial reality setups. A screen according to embodiments of the present invention such as any of the screens 10, 12, 14 of FIG. 1, is customized or "programmed" to accept light from a certain projection direction. Thus the projection screens such as one two, three or more screens are configured to accept projector light only from a corresponding projector dedicated to each screen. In a cinema there are rows of chairs extending towards the back of the cinema. This means that the viewing angle changes depending upon where a viewer is sitting and which screen they are viewing. For some viewing angles, it is possible to accommodate this variation in viewing angle via the curvature of the micro-lenses. For large viewing angles, e.g. possibly for side screens, the gap from which light escapes the patterned layer stack is preferably made diffusive. As the light is diffused when it emits the patterned layer stack of the screen, larger viewing angles no longer pose any limitations on the installation and the seating positions.

Embodiments of the present invention provide a projection screen which is preferably "programmed" to reflect only light coming from the projector. Any light coming from another direction such as ambient light is reduced, e.g. absorbed. The screen therefore appears black even in bright ambient light conditions. The screen also maintains a high system contrast, e.g. ANSI contrast in dark environments like a cinema, regardless of the reflections by walls, ceiling, seats and the audience.

In the production process according to embodiments of the present invention, the screen is covered with a photosensitive layer. This photosensitive layer is exposed by means of a (UV or parts of the visible spectrum) light source, with an angle of incidence identical to the angle of incidence of the projector at that particular position of the screen. The exposure of the photosensitive layer will define a screen structure that is different at the position of the focus of each micro-lens or micro-mirror, than in the remainder of the screen area. As such the alignment between the micro-mirrors (or micro-lenses) and the screen structure is automatically guaranteed and adjusted according to the direction of incidence of the projected light used to modify the photosensitive layer.

Different embodiments of the present invention including screen configurations and associated production methods are described below.

Embodiment 1: Micro-Patterned Polarizer

Figure 2:
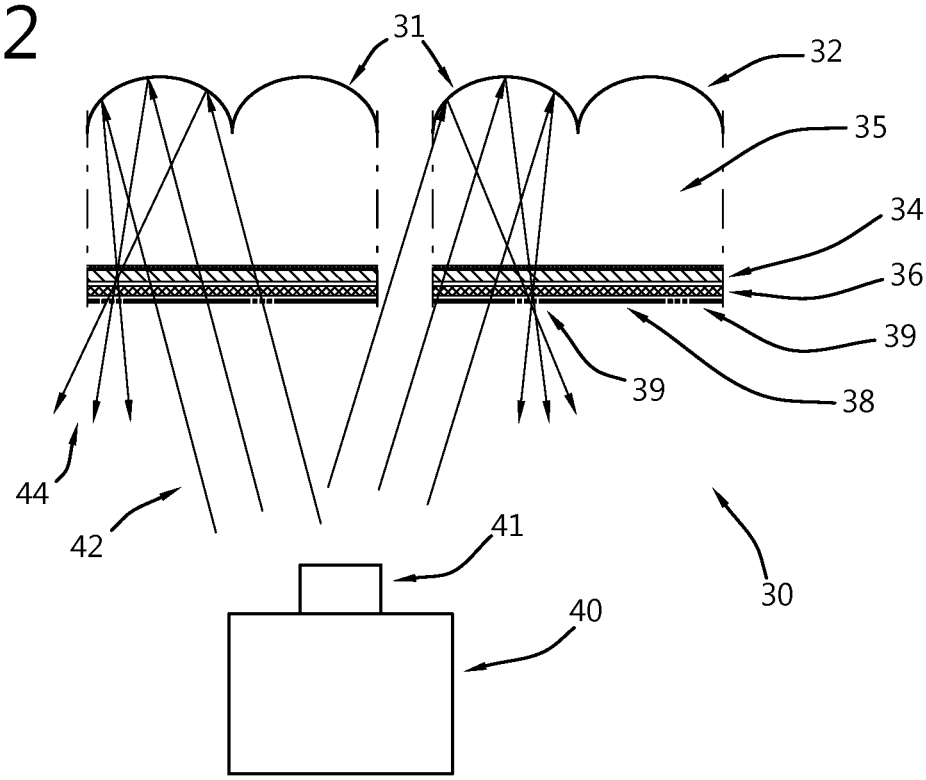
FIG. 2 illustrates a projection display screen according to an embodiment of the present invention.

A projection screen 30 in accordance with this embodiment is shown schematically in FIG. 2 and comprises a micro-lens array mirror 32 for receiving light 42 from a projector 40 with a projector lens 41 and for creating reflected light 44. The micro-lens array 32 has a reflective back layer 31. On the projector side of the micro-lens array mirror 32 there is installed in a sequence along the direction of light 44, a broadband quarter wave retarder 34 applied to a first major surface of a substrate 35. The substrate 35 has a first and a second major surface on opposite sides of the substrate 35. The micro-lens array mirror 32 can be formed in one major surface of substrate 35, e.g. the micro-mirrors or lenses 32 are fabricated on the second major surface of substrate 35. On the first major surface of the substrate 35 the broadband quarter wave retarder 34, a photoalignment layer 36 and a micro-patterned polarizer 38 are formed.

A micro-patterned polarizer is a polarizer where the polarization direction in a first area (e.g. the focus area) is different from the polarization direction in a second area (e.g. the space in between the focus areas). The size of the areas can be in the order of a few micro-meters to a few tens of micro-meters.

A micro-patterned polarizer layer, as an example, is disclosed in SUNFEST Technical Report TR-CST01DEC05, Center for Sensor Technologies, Dept of Electrical and Systems Eng, Univ. of Pennsylvania, Philadelphia, Pa. 2005, University of Pennsylvania SUNFEST NSF REU Program Summer 2005, entitled "Fabrication of micro-polarizer array with polymer thin film", Kejia Wu (Electrical and System Engineering, BS '06).

A method of photo-alignment in accordance with an embodiment of the present invention creates a polarizer 38 that:

1/ Passes a certain polarization of light over the majority of the screen surface. Preferably, the projector produces a polarized light output and the polarization of the light output by the projector is aligned with this pass direction over the majority of the screen surface.

2/ Passes the orthogonal polarization of light at the position of the focus of the mirrors 32 The light 42 coming in from the projector (parallel bundle) passes the polarizer 38.

Preferably the projector 40 produces polarized light with a polarization direction aligned with the screen polarizer 38; if not 50% of the projected light will be blocked. Upon reflection by the micro lens mirror 32 of the incident light 42, the reflected light 44 is focused at the position 39 where the polarizer 38 has the orthogonal polarization. Because the light has passed through the broadband quarter wave retarder 34 twice, the polarization of the light is rotated over 90° and the light can pass the polarizer 38 at the focus position 39. Ambient light will be polarized coming in. Light passing through the polarizer 38 and twice through the quarter wave retarder 34 after reflection by the micromirrors will obtain the orthogonal polarization direction. But since almost all of the light is exiting via a different position then the focus point 39, it will be blocked by the polarizer 38. Only in two cases ambient light can still enter and escape from the patterned layer stack:

If after reflection by the micro-mirrors it is directed towards the position of the focus point 39. But this can only be the case if the ambient light is coming from the same direction as the projected light. So as long as there are no ambient light sources in the immediate vicinity of the projection lens, all other ambient light sources will be absorbed by the screen.

Or if it enters via the focus point 39 and via the micro-mirrors is reflected to a position different from focus point 39. Most of the light entering through focus point 39 however will be reflected via the micro-mirrors towards the position of the projection lens 41. If a projection setup takes care that the audience does not block the light path between the projection lens and the screen (as is the normal practice), these ambient light reflections will also not be observed by the audience. Only if light enters via focus point 39 and is reflected via an adjacent micro-mirror element, it could still be directed towards the audience.

Preferably the area of the focus points 39 only occupies a small portion of the total area of the screen. For example less than 10%, preferably less than 1%, e.g. such that an attenuation of ambient light by a factor 10 or better is guaranteed.

The photo-alignment layer 36 can be "programmed" or "customized" by using polarized UV or parts of the visible spectrum light, for example. The alignment is driven by the polarization direction of the UV or parts of the visible spectrum light. When later a nematic liquid crystal is coated on top of the alignment layer 36 the nematic liquid crystal will follow the alignment programmed in the photoalignment layer 36. By adding a dichroic dye and by polymerizing the nematic liquid crystal layer a polarizer layer 38 is created. It is also possible to create a alignment layer by conventional rubbing techniques, even with patterning. But this is less preferred as there is a reduced flexibility to program different incident light directions and automatically align between the micro lens positions and the gaps. This can be used to make dedicated production tools for a screen that fits one predefined projection setup.

In this embodiment of a method to make a projection display screen 10, 12, 14 a polarized UV or parts of the visible spectrum light source is placed at the position where the projection lens 41 of the dedicated projector 40 will come. Automatically, because the light from the UV or parts of the visible spectrum light source also passes the broadband quarter wave retarder 34 (a condition being that the retarder also shows proper retardation for the UV or parts of the visible spectrum wavelength), the light at the focus position 39 will have a polarization direction that is orthogonal to the incoming polarization direction. So the photo-alignment layer 36 is automatically programmed to have the desired alignment at the proper positions.

This embodiment of the present invention is adapted in accordance with one, some or all of:
a) The light source for programming should preferably be a bit larger than the light bundle during normal projection. This to create some margin for projector misalignment, accommodate spherical and chromatic aberrations in the micro-structured substrate and tolerances in the production process
b) The concentration of light will preferably be different in the focus point then for the remainder of the screen surface. The goal is to illuminate long enough to obtain full alignment also in the area with the lowest light intensity. Alternatively it would be possible to develop the focus points first with a directive illumination source and then further develop the remainder of the screen area with a blanket illumination source (that has no particular directiveness). In which case the photoalignment material should be of the non-rewriteable type.

In practice it might not be feasible to configure the full screen, program the photo-alignment layer all at once and then apply and cure the NEMATIC LC coating, e.g. polymerize a nematic liquid crystal layer.

Field configuration might also not be feasible from an eye safety point of view, because during the programming rather high doses of UV (laser) light would be needed. An alternative is to use some parts of the visible wavelength, e.g. in the blue region.

There are photo alignment materials that operate with at least some wavelengths of visible light and these can bring a number of advantages for the described process. For example an Azo-dye based SD1 photo alignment material from Dai Nippon Ink & Chemicals has a maximum absorption for a UV wavelength of 365 nm, but still a reasonable sensitivity is obtained for blue visible wavelengths of 450 nm. Advantages of using such materials can be any of:
The photo alignment layer can be programmed with light coming from the projector itself, rather than a special UV source placed at the position of the projection lens.
Blue light can be used which is safer than UV.
The eye safety concerns with UV can be reduced or eliminated, as the permissible energy level for visible light is much higher than the permissible energy level for UV light.
The broadband quarter wave retarder would need to operate only in the visible wavelength range (e.g. 420 nm-680 nm) rather than in both the specified UV (e.g. 280-340 nm) wavelength range and the visible range (e.g. 420 nm-680 nm).

The method of manufacture of the screen 10, 12, 14 includes, in an embodiment, illumination of screen material, for example on a roll with a width of 1-1.5 m or more, with a parallel light bundle where the incident angle of that bundle can be adjusted in both horizontal and vertical direction on the fly, to match the incident angle of projector light at that part of the screen in its final use. And then after programming the photo-alignment layer 36, to coat with a polarizing layer, for example to coat with a liquid crystal polymer material such as NEMATIC LC material containing a dichroic dye, and polymerizing it to create the polarizer 38. As a post process, a protection layer can be applied (not shown).

Optionally, a diffuser can be applied on top of the focus points 39 for example by using diffuser particles in a UV curing adhesive and applying this to the focus points 39. Using a UV light source with steerable incident angle the light can be focused at the proper positions. Note that all positions will receive some UV light but at the focus points 39 the intensity will be much higher and these positions will be cured long before the curing is completed in the other areas. The uncured material can be removed, e.g. with a solvent with the result that only at the focus positions 39 a diffusing layer remains. A diffuser at the focus positions is advantageous in that the viewing angle of the projection display screen 30 is increased.

All this can be handled in a roll-to-roll process, producing strips of screen material. Each strip of material has at each position the appropriate alignment characteristics fitting the incident light direction that is intended in the final projection setup. The horizontal and vertical strips of screen material are then assembled together to make up the final customized screen.

Figure 3:
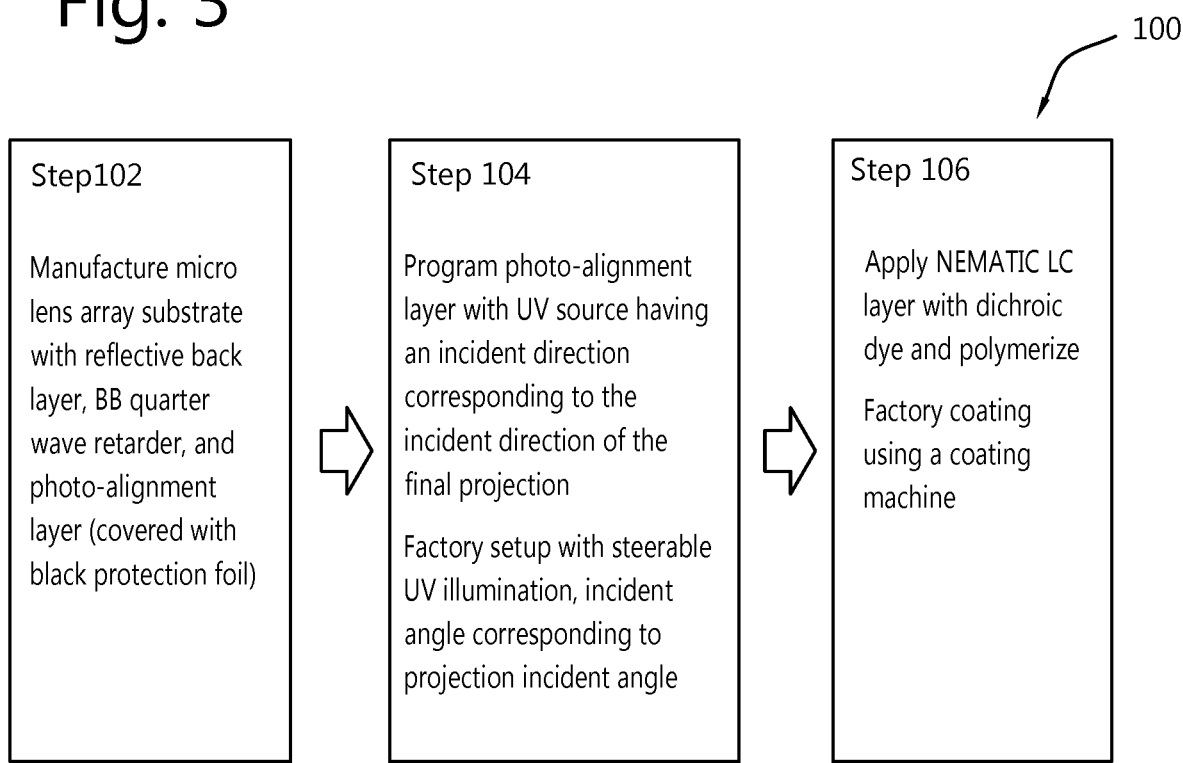
FIG. 3 illustrates a manufacturing process according to an embodiment of the present invention.

A method flow 100 in accordance with an embodiment of the present invention is shown in FIG. 3, where custom screens 10, 12 or 14 are created for a customer or user, the process making use of equipment to program the photo-alignment layer 36 as described above and to create the polarizer layer 38. In step 102 a micro lens array is formed on a suitable transparent substrate and a reflective back layer is applied on the micro lens array. A broadband quarter wave retarder 34, and photo-alignment layer 36 are applied on the other side of the substrate. Finally the assembly is covered with an optically opaque, e.g. black protection foil over the photo-alignment layer. In step 104 the photo-alignment layer 36 is developed using a light source such as a UV source having an incident direction corresponding to the incident direction of the final projection of the film or image by the projector 40. In step 106 liquid crystal polymer layer is applied such as a NEMATIC LC layer with dichroic dye and then polymerized.

Alternatively different types of screen 10, 12, 14 for a number of, or for every vertical/horizontal incident angle combination can be created. This can be done, for example, per increments of equal angles such as 0.5° or 1° for the horizontal and vertical incident angle. The screens so produced can be patched together to make a customized final screen from these "standard" screen types.

Selective Curing of Retarder

Next to the use of photo alignment layers an embodiment of the present invention has a potential to reduce process complexity as well as cost.

In the publication "Formation of Optical Films by Photo-Polymerisation of Liquid Crystalline Acrylates and Application of These Films in Liquid Crystal Display Technology", J. Lub, D. J. Broer, R. T. Wegh, E. Peeters, and B. M. I van der Zande, Molecular Crystals And Liquid Crystals Vol. 429, Iss. 1, 2005, in section 2.2, a method for thermal patterning of polymerized LC retarders is described. However rather than using a photomask for the patterned polymerization of the retarder layer, the light pattern here would be created by illuminating the micro-lens mirrors with light coming from the direction of the projected light in the final application. This way, the pattern of the half-wave retarder would automatically be aligned with the focus positions of the projected light.

For example the process could comprise or consist of the following steps in accordance with an embodiment of the present invention:

1/ Apply a polyimide layer on top of the micro-lens mirror sheet to form an alignment layer 2/ Use rubbing to create the alignment layer on the polyimide 3/ On top of this alignment layer coat a mixture of liquid crystalline (di-)acrylates and the initiator, with the required thickness to provide half-wave retardation.

4/ Use a directive UV light source with direction of incidence identical to the direction of incidence of the projector's light in the final application of the screen. And selectively crosslink the nematic film of liquid crystalline di-acrylates at the focus positions 5/ Heat the layer of liquid crystal di-acrylates above the transition temperature, so the non-cross-linked parts will become isotropic.

6/ Expose the heated film to blanket UV illumination (coming from all directions) to crosslink the isotropic parts. To obtain sufficient angular diversity a diffuser could be installed in between the UV light source and the liquid crystal layer, to make sure curing is accomplished over the entire surface.

The alignment of a liquid-crystal directors over the last few decades has been attempted with a variety of aligning materials and procedures, e.g. to treat the inside surfaces of glass plates which confine the liquid crystal. These include obliquely evaporated SiOx films, mechanically rubbed polyimide layers, photo-aligned light sensitive polymers, Langmuir-Blodgett films, lithographically micro-patterned polymers, nanopatterned surfaces using an atomic force microscope (AFM) or ion-beam etching surfaces, etc. Owing to their low cost and the ease with which large areas may be coated with high quality uniform films, rubbed polyimide layers are by far the most commonly used alignment method in commercial devices. However the present invention is not limited to rubbed polyimide as an alignment layer.

Laser Patterning

Another approach to pattern the half wave retarder layer is to laminate a half wave retardation foil on top of the micro-lens mirror sheet, and then use a high power laser source with incident direction identical to the direction of incidence of the projector's light in the final application of the screen. A commercially available half wave retardation foil may be used.

The laser power is tuned to obtain that at the position of the focus:

The half wave retardation foil is turning isotropic

Or, a hole is cut into the half-wave retardation foil.

Since the laser source is not used for curing, but only to generate heat, other wavelengths then UV light can be used, including visible wavelengths and IR. However, since the retarder foil is highly transparent, at least for the visible wavelengths, it could be advisable to apply a semi-transparent/semi absorbing layer on top to facilitate the process of generating heat at the focus positions.

An advantage of using a prefabricated retardation layer is that it will be easier to obtain a uniform layer thickness and thus a uniform retardation at every position. Further, to attain a broadband retarder behaviour over the entire visible range, it is advantageous to use a compound retardation layer. Commercial retarders with broadband characteristics over the entire visible range are available. For example from the company Zeon a half wave retardation foil with very stable retardation over the entire visible light range is available (ZeonorFilm® ZM 14-270-920).

Embodiment 2: Micro-Patterned Broadband Half Wave Retarder

Figure 4:
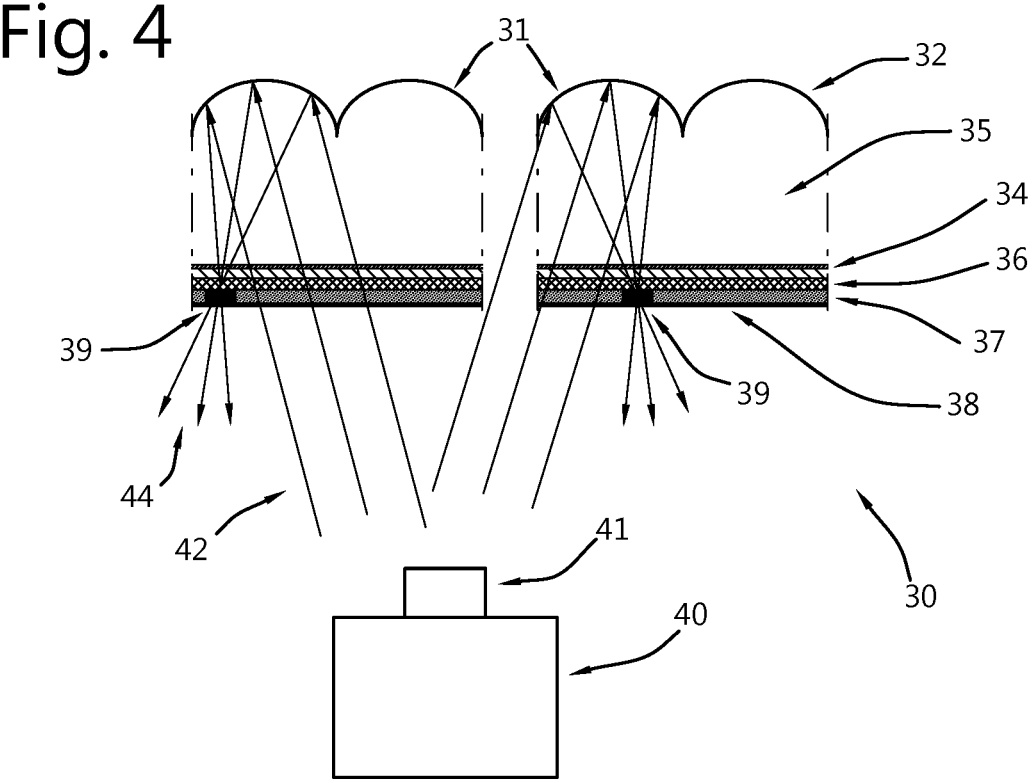
FIGS. 4 to 6 illustrate projection display screens according to further embodiments of the present invention.

A projection screen 10, 12, 14 in accordance with this embodiment is shown schematically in FIG. 4 and comprises a micro-lens array mirror 32 for receiving light 42 from a projector 40 having a projections lens 41 and for creating reflected light 44. On the projector side of the substrate 35 away from the side with the micro-lens array mirror 32, there is installed in a sequence along the direction of the reflected light 44, a broadband quarter wave retarder 34 a photoalignment layer 36, a micro-patterned broadband half wave retarder 37 and a polarizer 38.

In accordance with this embodiment the same operation as described for the first embodiment can be obtained using a uniform polarizer 38 in combination with a micro-patterned half wave retarder 37.

This embodiment of the present invention provides a method of photo-alignment of a half wave retarder 37 created that in accordance with one, some or all of:

1/ Does not have a preferred alignment direction over most of the screen surface, hence has equal retardation for every polarization direction and therefore leaves the polarization of the light passing through it unaffected.

2/ Or has a preferred alignment in line with the polarization direction of the incoming light.

3/ Provides a half wave retardation at the focus of the mirrors.

In this embodiment light 42 from the projector 40 through the projector lens 41 entering via the polarizer 38 will obtain the orthogonal polarization after passing the broadband quarter wave retarder 34 twice. However after passing the half wave retarder 37 at the focus point 39, the polarization will be rotated once more by 90° such that the outgoing polarization direction is aligned with the incoming polarization direction and can pass through the polarizer 38. Ambient light not passing through the focus point will maintain the orthogonal polarization direction and be absorbed in the polarizer 38. Again ambient light can only escape from the patterned layer stack:

If after reflection by the micro-mirrors it is directed towards the position of the focus point 39.

Or if it enters via the focus point 39 and via the micromirrors is reflected to a position different from focus point 39. The polarization direction will then be rotated 90° by the half wave retarder 37 and another 90° by the double pass through the quarter wave retarder 34 such that it can escape via the polarizer 38.

The same considerations can be made for those two special cases as in the previous embodiment and again the ratio of the area of the focus points 39 to the total area should be 1/10 or smaller to guarantee a high attenuation of ambient light.

Also in this embodiment, to manufacture the programmed screen 10, 12, 14 a polarized UV or parts of the visible spectrum light source is placed at the position where the projection lens 41 will come when screen 30 is in use as a projection screen. The entire area of the screen 10, 12, 14 will be illuminated with the incoming light having an incoming polarization direction. At the focus point 39 however the illumination level will be much higher and dominated by light with a polarization direction that is orthogonal to the incoming polarization. If this illumination is stopped as soon as the processing of the photo-alignment layer 36 is completed in the focus area 39, the alignment will still be random in the other areas.

Then the full projection screen 10, 12, 14 is illuminated with diffuse unpolarized light. This will define the alignment outside the focus areas 39 to be random. Note that the photo-alignment layer 36 has to be of the non-rewriteable type.

The photoalignment layer 36 is then coated with a nematic liquid crystal layer and polymerized. The alignment in the focus regions 39 and the layer thickness are tuned to obtain a broadband half wave retardation.

An advantage compared to the previous method is that the alignment direction in the focus area 39 can now be controlled independently from the alignment direction in the main area, and it is no longer required that the quarter wave retarder 34 also has properly controlled quarter wave retardation at the UV or parts of the visible spectrum wavelength. Also as the illumination light bundle in the second step no longer needs to be collimated, it is easier and lower cost (no laser light required) to increase the illumination power and reduce the processing time.

A disadvantage is that the layer thickness of the polymerized LC is a critical parameter. In this method the patterned retarder 37 can be laminated with a standard polarizer 38.

Variant to Embodiment 2: Micro-Patterned Broadband Half Wave Retarder

Figure 10:
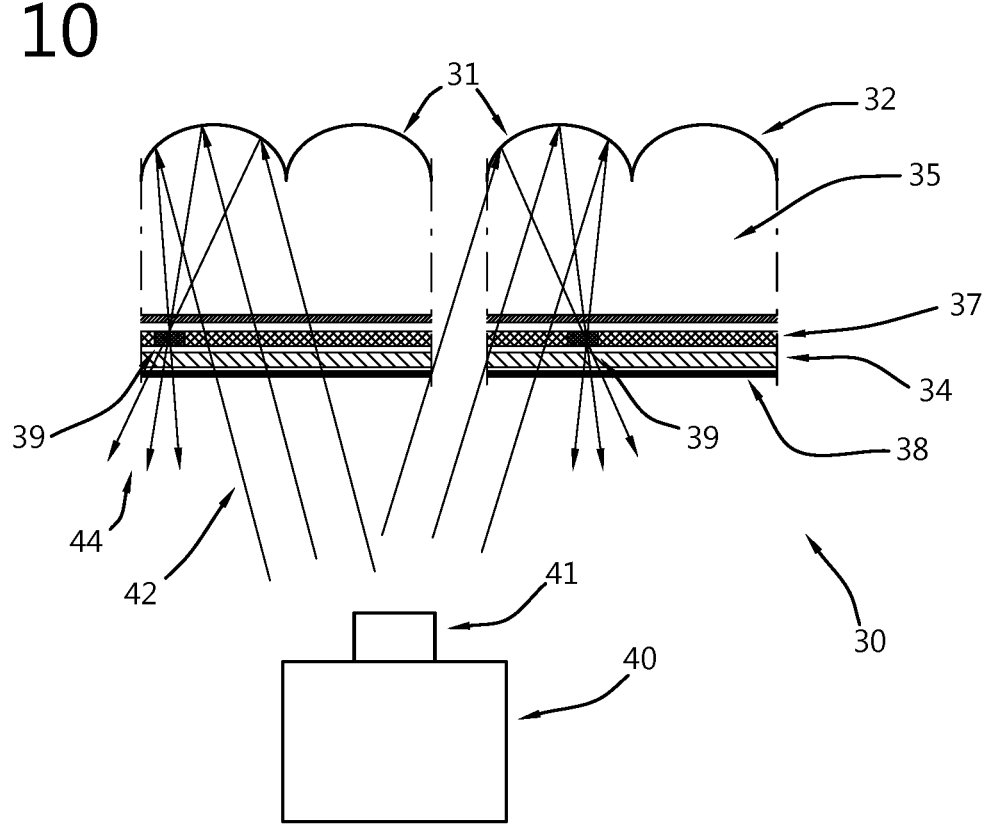
FIG. 10 illustrates an alternative to the second embodiment of the present invention of a projection display screen using a circular polarizer.

Combinations of polarizers and broadband quarter wave retarders are available in the industry as complete assemblies and are known as circular polarizers. Circular polarizers are used for example to obtain high contrast OLED displays. These assemblies come with anti-reflection and/or anti-glare treatment, hard coat layers, and self-adhesive layers. A circular polarisers can be used as a projection screen. To be able to take advantage of this standard component and not be dependent upon the precise layer stackup required (e.g. thickness of protective layers, distance between quarter wave and polarizer, . . . ), it is preferred to implement a variant on the second embodiment shown in FIG. 4 with which the position of the quarter wave retarder and the patterned half-wave retarder are switched. Thus, a patterned half-wave retarder is first applied onto the microlens array mirror and then a commercial circular polarizer is laminated on top, as shown in FIG. 10.

Switching the order of the layers has the additional advantage that the broadband quarter wave retarder 34 does not interfere with the patterning process of the half-wave retarder 37. And therefore, if UV light is used for the patterning of the half-wave retarder, it is no longer required that the quarter wave retarder also meets the required specifications in the UV spectrum.

There are two additional configurations of the micropatterned half wave retarder which can work with this alternative to the second embodiment.

A first configuration which is an embodiment of the present invention where:

It provides a half wave retardation at the focus position of the micro-lens mirrors The layer is isotropic, or in other words has no preferred orientation and provides no retardation in the remainder of the screen area.

A second (complementary embodiment) configuration where:

The layer is isotropic, or in other words has no preferred orientation and provides no retardation at the focus position of the micro-lens mirrors It provides a half wave retardation in the remainder of the screen area.

Ambient light, not entering via the focus point, will in the first configuration pass the patterned half-wave retarder layer via the isotropic part twice, and is not affected by it. In the second configuration, it will pass the half wave part twice, resulting in a full wave of retardation, such that it is also transparent in terms of polarization. In both cases the circular polarizer in combination with the reflecting layer of micro-lens mirrors will properly extinguish the ambient light.

Light from the projector passing the focus point will in either of the two configurations pass the half-wave retarder only once. It will therefore alter the handiness of the circularly polarized light such that upon exit via the quarter wave retarder the outgoing polarization direction is aligned with the incoming polarization direction and can pass through the polarizer.

Embodiment 3: Selectively Etched Polarizer

Figure 5:
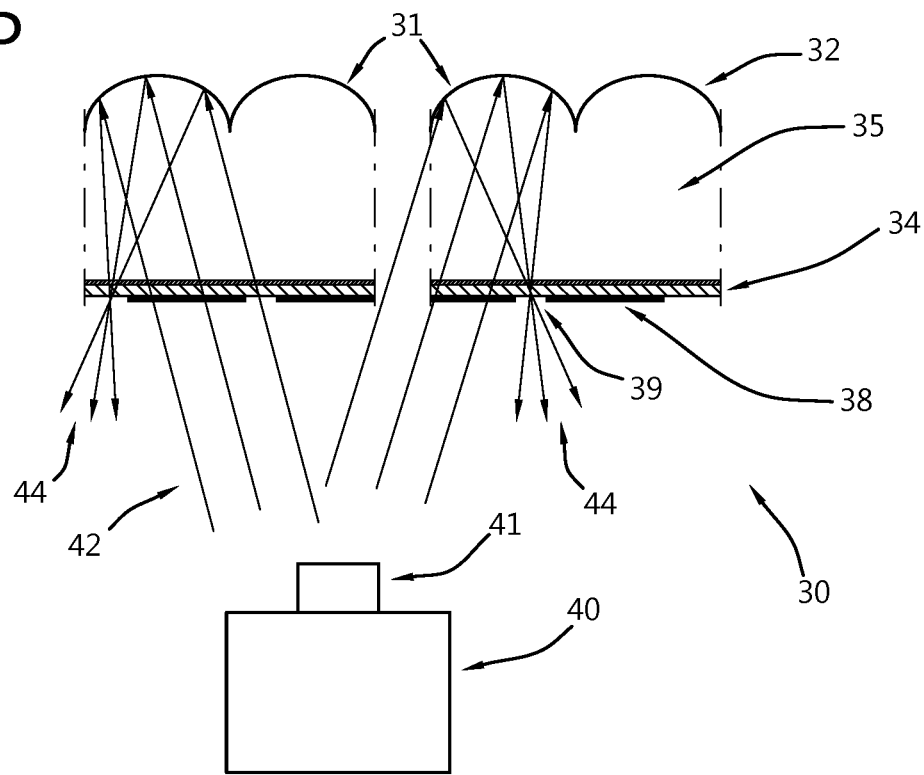

A projection screen 10, 12, 14 in accordance with this embodiment is shown schematically in FIG. 5 and comprises a micro-lens array mirror 32 for receiving light 42 from a projector 40 with a projector lens 41 and for creating reflected light 44. On the projector side of the micro-lens array mirror 32 there is installed in a sequence along the direction of light 44, a broadband quarter wave retarder 34 a patterned, e.g. etched polarizer 38 is formed.

If holes are provided in the polarizer 38 at the point where the reflected projector light 44 is focused (i.e. at focus points 39) this will allow the majority of the ambient light to be rejected. While this is not the case for the ambient light entering through the hole 39, ambient light entering through the focus point 39 will not be absorbed but the majority will be reflected towards the projector and ambient light can escape via the focus point 39 but for this it has to originate from the same direction as the projected light 42. Again the ratio of the area of the focus points 39 to the total area should be $1/10$ or smaller to guarantee a high attenuation of ambient light.

Note that the ambient light that enters via the holes 39 is not scattered in random directions. Instead it is reflected in a very specific direction; the direction of the projector 40. Therefore, if the screen 10, 12, 14 is only angle selective in the horizontal direction (i.e. by means of a vertical lenticular lens structure), when the projector 40 is behind the audience. One will observe a certain vertical image band where the ambient light is not rejected.

The substrate is assembled with the quarter wave retarder and the polarizer and then covered with a positive photoresist layer. A photoresist layer needs to be selected that has high transparency even at relatively thick layers (e.g. AZ 4000 from Hoechst). After this the substrate can be covered with a protection foil that blocks any UV or parts of the visible spectrum light and stored for an undefined time period.

In theory it would be possible to laminate a commercial circular polarizer (combination of a quarter wave retarder 34 and a linear polarizer and cover it with a photoresist layer. However, this would complicate the later patterning of the polarizer because such a polarizer typically is protected with a cap layer that would need to be removed and the layer thickness of the polarizer is highly variable as the polarizing layer is typically realized by stretching PVA dichroic material. It is therefore preferable that both the quarter wave retarder and the polarizer are created by photo-alignment techniques.

At a different point in time, and potentially at a different location, the protection foil is removed and the photoresist layer is exposed to UV or parts of the visible spectrum light with the proper wavelength (either unpolarized or with a linear polarization aligned with the pass direction of the input face polarizer). Again the UV or parts of the visible spectrum light source is positioned at the position of the projection lens 41 in the final application, or has an incident angle that matches the incident angle of the projected light in the final application. Therefore the position where the UV or parts of the visible spectrum light focusses will be identical to the position where the projected light will focus.

The broadband quarter wave retarder 34 now needs to be selected such that the retardation at the UV or parts of the visible spectrum wavelength is substantially longer than a quarter wave, preferably it provides half wave retardation at the selected UV or parts of the visible spectrum wavelength.

A significant portion of the light that is focused will need to pass the polarizer, and the light intensity at the focus points 39 will need to be substantially (e.g. 1 order of magnitude or better) higher than the light intensity in other positions of the screen. The positive photoresist 36 will thus be exposed primarily at the focus points 39 and to a significantly lower extent in the other areas of the screen.

After exposure the photoresist layer is developed using a suitable developer (e.g. AZ 400K AZ 421K) and rinsed with distilled water. Optionally postbaking and UV stabilization can be applied to make the photoresist layer more stable. The photoresist will be removed in the focus points 39 and covers the other areas of the screen. Some developer materials will not only remove the developed photoresist, but will at the same time also be capable to remove the polarizer Optionally now the gap can be filled with a mixture of a UV curing epoxy and a diffuser material (e.g. $TiO_2$). Using again the directive UV light source the diffuser layer is cured only at the focus positions, while the remainder of the UV curing epoxy and diffuser material is removed.

Embodiment 4: Selectively Etched Polarizer and Quarter Wave Retarder

Figure 6:
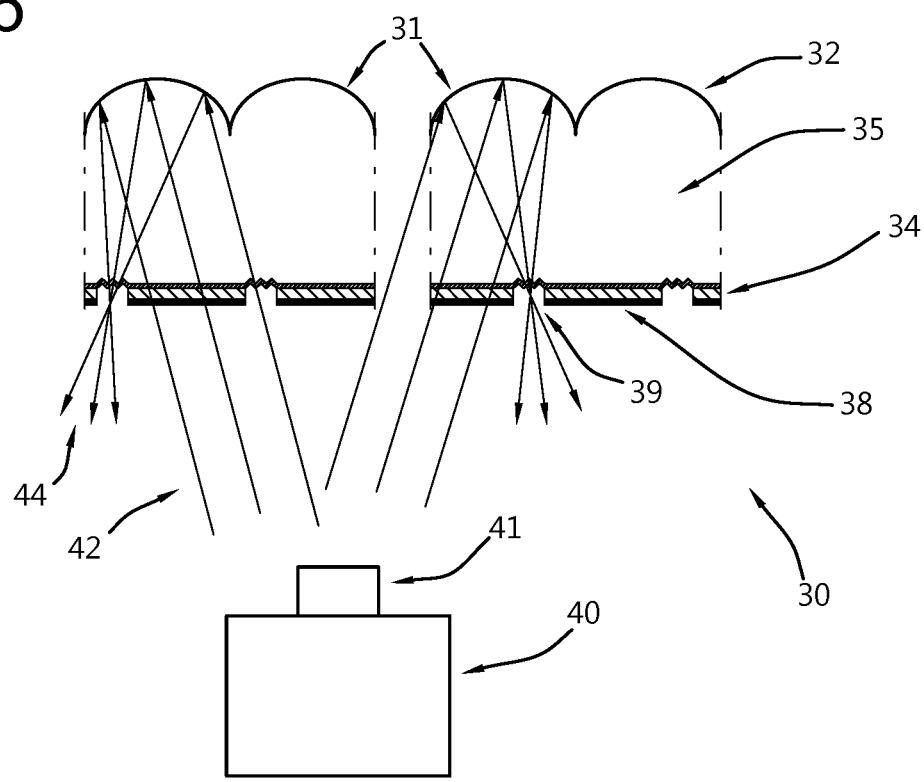

A projection screen 10, 12, 14 in accordance with this embodiment is shown schematically in FIG. 6 and comprises a micro-lens array mirror 32 for receiving light 42 from a projector 40 with a projector lens 41 and for creating reflected light 44. On the projector side of the micro-lens array mirror 32 there is installed in a sequence along the direction of light 44, a patterned, e.g. etched broadband quarter wave retarder 34 applied to a first major surface of a substrate 35. A patterned, e.g. etched polarizer 38 with holes 39 are formed, the substrate being roughened in the holes 39 to create a diffuser element.

In the previous configuration the broadband quarter wave retarder 34 below the hole 39 in the polarizer 38 has no function. It can be etched away aligned with the hole 39. In this case no cap layer is needed in between the polarizer 38 and the quarter wave retarder 34.

It might even be beneficial if also the surface of the base substrate 35 is roughened by the etching. This way a diffuser function would be automatically obtained inside the holes 39.

Patched Projection Screen

In accordance with embodiments of the present invention each screen 10, 12, 14 is programmed according to the projector setup as described above for four embodiments. However, for any embodiment it is included within the scope of the present invention to have a (large) number of pre-programmed screen types that are optimized for a certain horizontal incident angle and/or a certain vertical incident angle. An inventory of screen types with increments of horizontal and/or vertical angle e.g. 1° in horizontal and/or vertical angle is kept (or at a different horizontal and/or vertical angle such as an angle anywhere between 0.1 up to 10° as absolute value). A screen would then be patched together from those pre-programmed screen types, to fit the final projection setup an example of which is shown in table 1.

TABLE 1

| | | | | | | | | | | |
|---|---|---|---|---|---|---|---|---|---|---|
| 2°/−5° | 2°/−4° | 2°/−3° | 2°/−2° | 2°/−1° | 2°/0° | 2°/1° | 2°/2° | 2°/3° | 2°/4° | 2°/5° |
| 1°/−5° | 1°/−4° | 1°/−3° | 1°/−2° | 1°/−1° | 1°/0° | 1°/1° | 1°/2° | 1°/3° | 1°/4° | 1°/5° |
| 0°/−5° | 0°/−4° | 0°/−3° | 0°/−2° | 0°/−1° | 0°/0° | 0°/1° | 0°/2° | 0°/3° | 0°/4° | 0°/5° |
| −1°/−5° | −1°/−4° | −1°/−3° | −1°/−2° | −1°/−1° | −1°/0° | −1°/1° | −1°/2° | −1°/3° | −1°/4° | −1°/5° |
| −2°/−5° | −2°/−4° | −2°/−3° | −2°/−2° | −2°/−1° | −2°/0° | −2°/1° | −2°/2° | −2°/3° | −2°/4° | −2°/5° | layer 38, enabling a single wet developing and etching step. Note that then no cap layer is put on top of the polarizer layer 38. But in order to keep the quarter wave layer 34 intact a cap layer is preferred in between the quarter wave retarder 34 and the polarizer 38.

The downside of a photoresist with similar material characteristics as the polarizer 38 is that it becomes difficult to remove the unexposed photoresist without damaging the underlying polarizer 38. Preferably, then the photoresist is transparent for visible light such that it does not need to be removed.

The downside of removing the polarizing layer via wet etching is that significant under-etching can occur. It is therefore preferable to use a different etching technique such as reactive ion beam etching.

Table 1 illustrates a patched projection screen structure, composed of 55 predefined screen types.

Preparation of the Substrate

For the substrate a transparent optical foil can be used with low birefringence. Such a foil in polycarbonate material can be achieved for example by using an optimized extrusion process such as described in US20030099808 or by mixing a material with negative birefringence with a material with a positive birefringence in the appropriate ratio (for example the APEL™ Cyclo Olefin Copolymer of Mitsubishi chemical). Thickness of the foil is for example 100 um On top of the substrate the micro-lenses are formed using a roll-to-roll replication process. For example, by molding and UV-curing of a UV curable polymer or by hot-embossing. The micro-lenses can have a spherical or aspherical shapes with a curvature such that a parallel bundle of light (at normal incidence) after reflection will focus at the opposite side of the substrate.

A protected aluminum mirror coating is then applied on top of the micro-lens structure using vapour deposition techniques. A cap layer could be applied on top to protect the micro-lenses and aluminum coating during further processing of the foil.

On the opposite side of the substrate a uniform stacked layer comprising a broadband quarter wave retarder is now added. While it would be possible to accomplish this by laminating a commercial broadband quarter wave retarder (e.g. Zeonorfilm™ by Zeonex), also photo alignment methods could be used to produce a quarter wave retarder with broadband and wide viewing angle. The retarder should for all 4 embodiments provide a quarterwave retardation over the visible wavelength range (420 nm-680 nm). However, the desired behavior for the UV or parts of the visible spectrum wavelength used in the photo-patterning step depends upon the targeted patterned layer stack.

For embodiment 1: the retardation should also be exactly quarter wave for the UV or parts of the visible spectrum light.

For embodiment 2: the retardation at the UV or parts of the visible spectrum wavelength should not be exactly defined, but the polarization of the incoming UV or parts of the visible spectrum light should be adjusted to compensate for the retardation and obtain the desired linear polarization at the focus point, For embodiments 3 and 4: unpolarized UV or parts of the visible spectrum light can be used or UV or parts of the visible spectrum light that is linearly polarized in line with the pass direction of the polarizer. The broadband quarter wave retarder now needs to be designed such that the retardation at the UV or parts of the visible spectrum wavelength is substantially longer than a quarter wave. Preferably it provides half wave retardation at the selected UV or parts of the visible spectrum wavelength.

The Directional Collimated UV or Parts of the Visible Spectrum Light Source

While the layer stackup and the production method is slightly different between the 4 embodiments described above, they all rely on exposing a photo-sensitive layer with (UV or visible wavelength) light whose angle of incidence is identical or a at least similar to the angle of incidence of the projected light on that particular position on the screen in the final application.

A directional collimated (UV or visible wavelength) light source can be provided by a combination of a suitable light source (e.g. UV or visible wavelength, such as laser or LED) and a collimation lens, whereby a motorized control can be implemented to change the relative position of the light source versus the collimation lens. The motorization is driven such that the incident light direction on the substrate is similar to the incident light direction in the final application from the projector.

Figure 8A:
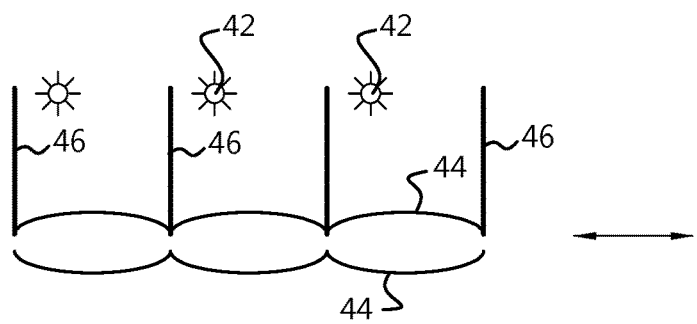
FIGS. 8a and 8b illustrate a method of photoalignment according to an embodiment of the present invention.
Figure 8B:
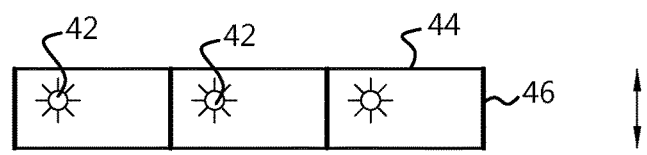

For use in any of the embodiments of the present invention including, for example, a roll-to-roll process, a linear array of multiple light sources 42 and collimation lenses 44 could be used, with absorbing light partitions 46 in between light sources 42 to avoid cross coupling (see FIGS. 8*a*—side view and 8*b*—top view). The light sources 42 can be UV light sources or light sources in the blue visible region, e.g. LED or laser light sources.

Either the array of light sources 42 could be fixed and the lenslets 44 moveable or the lenslets 44 could be fixed and the array of light sources 42 moveable. The movement can be in an X-direction motion, to control the incident angle in a first e.g. horizontal direction, and the movement can be in a Y-direction motion, to control the incident angle in a second e.g. vertical direction.

Multi Projector Setups

In some applications multiple projectors project on the same position on the projection screen, Some examples:

- 2 projectors project side by side with a certain overlap zone where the image gradually transitions from the first projector to the second projector. This is a so called edge blended projector setup, using two projectors. By use of the present invention the effect of ambient light to reduce contrast is reduced or suppressed.
- 2 projectors project overlapped images to increase the brightness of the image.
- 2 projectors project overlapped images in order to generate a stereoscopic projection. The first projector projects the image with the left-eye information the second projector projects the image with the right-eye information.
- 2 projector project each a portion of the information of the image. The first projector projects the background information the second projector projects the additional information (e.g. subtitles, highlights . . . )

The patterned layer stack then has to be programmed such that the light from both projectors can escape from the patterned layer stack. In this case during the development process 2 light sources are used. A first light source with an angle of incidence corresponding to the angle of incidence of the first projector and a second light source with an angle of incidence corresponding to the angle of incidence of the second projector are used. If multiple projectors are to be used, the number of photoalignment processes performed on the projection screen is more than one up to the number of projectors which place an image on one part of the projection screen.

Optical Replication of the Acceptance Aperture

It is recommended for one, some or all embodiments of the present invention to keep the thickness of the substrate 35 small relative to the size of the micro-lens mirrors. With thicker substrates 35 it is possible for light that is incident at a different angle than the programmed angle of incidence of the projected light, to be focused at the position of an adjacent focus point 39, where it can escape the patterned layer stack. So with thicker substrates 35 there is an effect of optical replication of the acceptance aperture. Instead of a single acceptance position of projected light, there are then a number of discrete positions from which light is accepted. Reflections from ambient light sources placed at these discrete positions will not be suppressed or will only see minor suppression (as the quality of the focus at these positions will no longer be optimal). Given that the area from which ambient light is suppressed is still much larger than the area from which ambient light is not suppressed, the average reflection of ambient light will still be quite low.

However, there is also the reciprocal effect that needs to be considered. Ambient light entering through the focus positions will not only be reflected towards the position of the projector lens, but also towards the replicated positions of the acceptance aperture. Therefore, for certain discrete viewing angles that correspond to the incident angle from those replicated positions of the acceptance aperture, there is no suppression of ambient light. Looking at the projection screen a viewer will observe certain areas with ambient light suppression as desired, and certain (relatively small) areas with no ambient light suppression.

Figure 9:
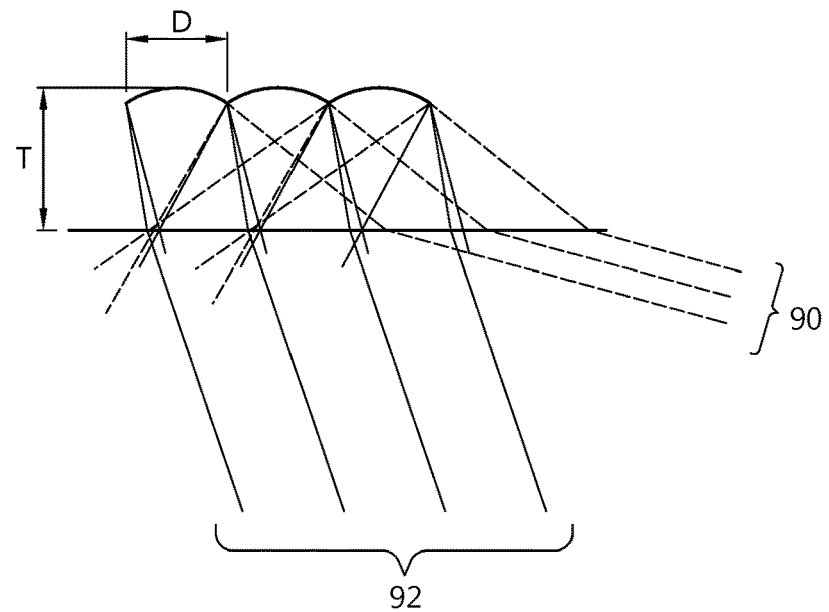
FIG. 9 illustrates a relationship between a thickness of a substrate and a diameter of a mirror of a micro-lens array mirror for use in embodiments of the present invention.

If the substrate is sufficiently thin, such that light that is incident on one micro-lens mirror at the critical angle, cannot reach the focus point 39 of an adjacent micro-lens mirror, this situation can be avoided. For typical substrates (for example for a refractive index n>1.5), this condition will be met when the substrate thickness T is smaller than the diameter of the micro-lens elements D (T<D)—see FIG. 9.

However, for practical use it would be sufficient if the thickness of the substrate 35 is chosen such that those discrete viewing angles, for which the suppression of ambient light is not working, are located outside the viewing angle range of interest. For example if the projection screen is designed for use within a range of viewing angles of +/−30 degrees, it is acceptable to have discrete viewing angles in the range of +30° to +90° and in the range of −90° to −30° where ambient light is not suppressed. In this case the thickness of the substrate T should be smaller than approximately 3 times the diameter of the micro-lens D (T<3D).

The above reasoning assumes a micro-lens mirror array of a regular structure. When the surface structure of the substrate 35 that is the micro-lens mirror array 31 is not a regular array but is a pseudo-random or random array, e.g. pseudo-random or random angle of optical axis, and/or size of micro-lens mirror elements, random variations of spherical or aspherical shapes with different curvatures (see FIG. 7) then the position of the replicated acceptance apertures 39 would also be randomized. As the photo alignment process uses the micro-lens mirror array 31 of the final projection screen, the photo alignment process will copy the pseudo-random or random arrangement of the micro-lens mirrors. When within the dimensions of a pixel of the projected image a large number of random micro-lens mirror elements are present, then the small amount of ambient light that enters through the focus points 39 would not be reflected in a single viewing direction, but it would be distributed over a large number of viewing directions. The ambient light reflection level in a single discrete viewing direction could then be sufficiently suppressed to allow it within the viewing angle range of interest, and hence a thicker substrate can be used.

Simulators

Simulators carry out the important function to allow pilots or drivers to be trained in all types of situations before the pilot or driver experiences these in real life. Any of the embodiments of the present invention may be used to provide the projection screen or projections screens for a window or windows of cabs or cockpits of vehicles such as bridges of ships, boats or barges, truck cabs, train cabs, trams (streetcars), busses, automobiles, aircraft etc.

The projection display screens according to any of the embodiments of the present invention can be configured as close as possible to realistic windows in such driving cab, e.g. the screens can be flat or curved, can have obstructions such as window jambs and sills. By the use of more than one projector per window, high intensity highlights can be shown realistically, e.g. to display bright lights, the sun or reflections thereof.

Maintain Brightness

The screen according to embodiment of the present invention only accepts a single incoming polarization.

Preferably the projector produces polarized light at the output and the direction of polarization is aligned with the polarization accepted by the screen.

If however the projector produces unpolarised light, it can be use but half of the light output is lost. In this case the brightness could be maintained when a polarization recuperation system is installed in front of the lens. Such a polarization recuperation system has been described in WO2008141247 for a different application.

The light beam from the projection lens can be split in 2 polarizations. The polarization direction that cannot be accepted by the screen is rotated by means of a half wave retarder. The two beams are combined again on the projection screen. Lenses are added to compensate for optical path length differences.

3D Setup

Since the screen does not depolarize, principally it is compatible with stereo projection based on polarization. However, because the screen only accepts a single incoming polarization, it is not compatible with regular polarization stereo projection setups.

An embodiment of the present invention makes 3D possible by a dual projector setup wherein a first projector produces the left image and a second projector produces the right image. The two projectors should be sufficiently far apart such that the focus positions (on the screen) of the left image and the right image are in non-overlapping positions.

Contrary to normal dual projection stereo setups, both projectors produce light with the same polarization and aligned with the polarization direction that is passed by the polarization layer of the screen.

It is the screen that is adapted in this embodiment to produce a different output polarization for the left image and for the right image.

Figure 11:
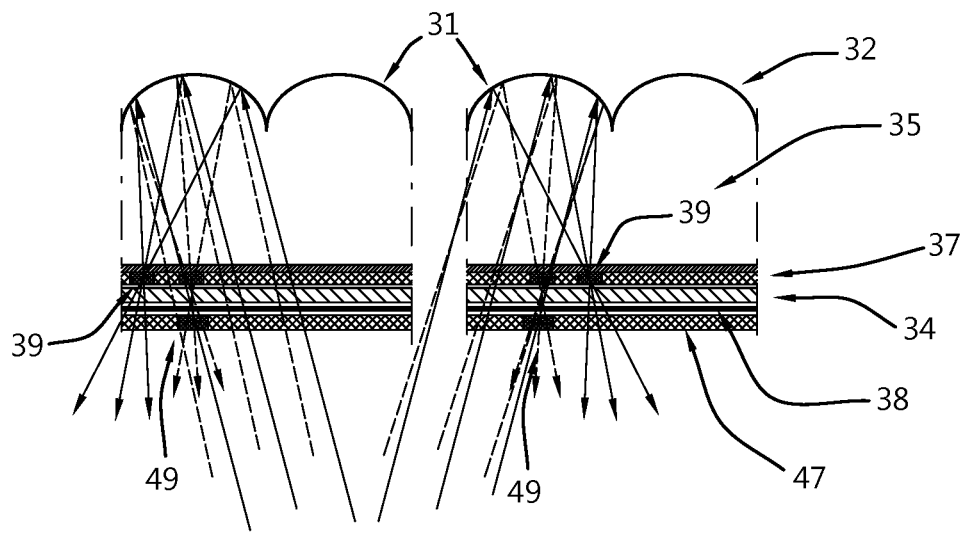
FIG. 11 illustrates a projection display according to an embodiment of the present invention for use in a 3D setup.

An additional patterned half-wave retarder 47 is needed such that it selectively applies half wave retardation at the exit position 49 of either the left or the right image, as shown in FIG. 11.

For example, in the structure of embodiment 2 discussed before, this additional patterned half-wave retarder can be applied externally to the polarizing layer.

Figure 12:
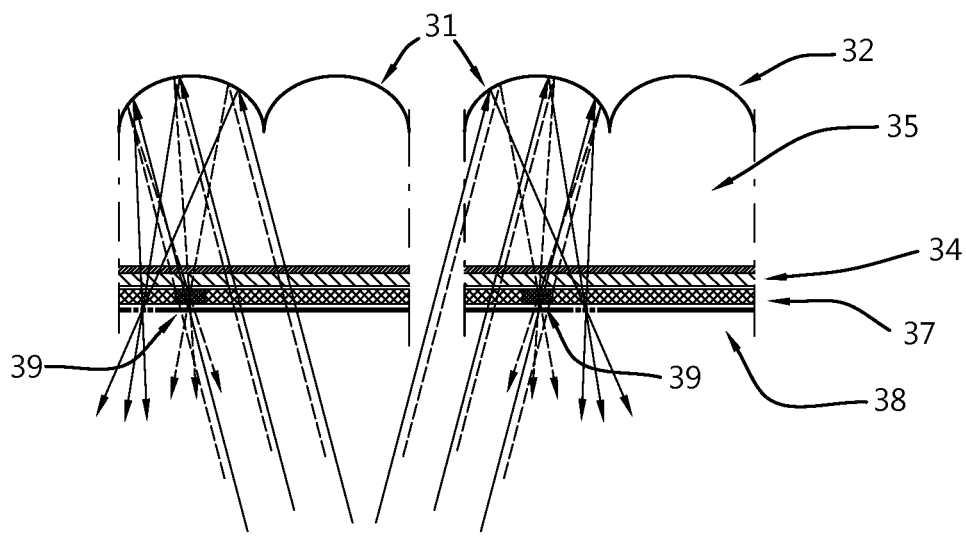
FIG. 12 illustrates another embodiment of a projection display according to the present invention for use in a 3D setup.

In theory, this could be applied with any of the mentioned embodiments. However, it is required that both patterned layers are in close proximity to the point where the micro-lens mirrors focus the light from the projector. The separation between both patterned layers therefore should be small relative to the focus distance (e.g. preferably the separation is <$\frac{1}{10}^{th}$ of the focus distance down to zero or as low as possible). In practical thin flexible screen configurations, this will not be possible when using a commercial polarizer embedded between protective layers with thickness in the order of 50-100 um. It is therefore preferred to combine the patterned half-wave retarder with a photo-aligned patterned polarizer (see embodiment 1 for example) as shown in FIG. 12 or an etched polarizer layer (see embodiments 3 and 4).

Methods to apply both patterned layers using self-aligning procedures can be used as previously described. For example, to produce the screen structure illustrated above, a micro patterned broadband half wave retarder can be created using selective curing with light from the direction of the left projector (red light rays) followed by curing at elevated temperature with blanket illumination. Whereas the micro-patterned polarizer can be created using the photo-alignment method of embodiment 1 with polarized light coming from the direction of the right projector (blue light rays).

An advantage of the screen and stereo projector setup, is that stereo crosstalk is limited only by the characteristics of the patterned broadband half wave retarder that is selectively applied in the left or right focus point, or by the quality of the micro-patterned polarizer. It should therefore be possible to achieve near perfect orthogonal polarization between left and right image and therefore minimal stereo crosstalk.

Whereas a normal silver screen will always introduce a certain degree of depolarization.

Note of course that head tilt from the observer can still introduce additional crosstalk. In order to reduce sensitivity to observer head tilt, it can be preferred to work with circular rather than linear polarized glasses; then an additional broadband quarter wave retarder can be applied on top of the screen. Both projectors will in this case also need to provide light with circular polarization having appropriate handiness such that the light after passing to the added broadband quarter wave retarder has the appropriate linear polarization direction in order to pass the screen polarizer layer.

Specular Reflection

A projector is an extremely bright light source; specular reflection at the front screen surface can therefore be very bright. Even if this contributes to the image, it can create an objectionable bright hotspot. The location of this hotspot will depend on where the viewer is located relative to the screen.

Figure 13:
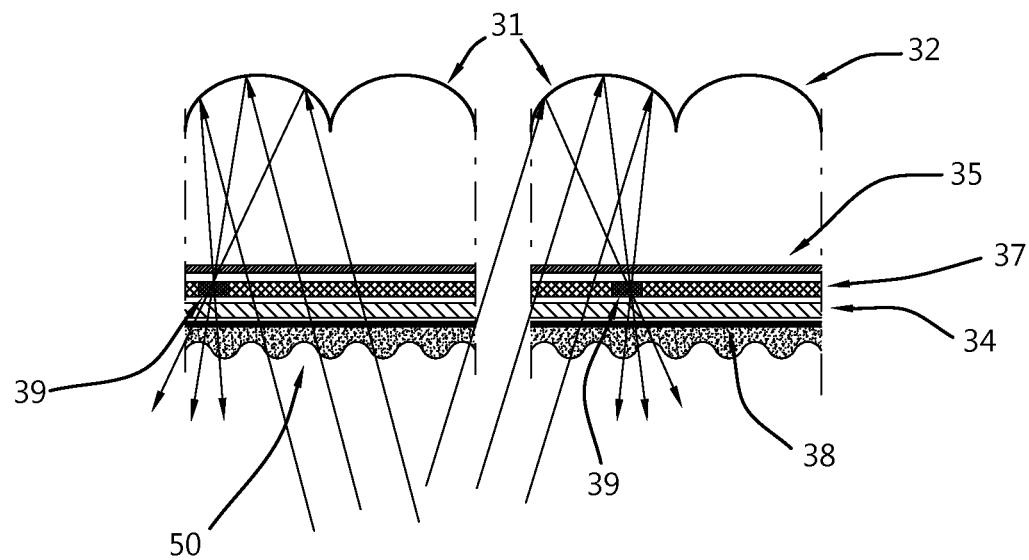
FIG. 13 illustrates a projection display according to another embodiment of the present invention with an antiglare structure.

It is preferred that measures are taken to reduce specular reflection at the front screen surface. An anti-reflection coating is recommended, but might still not reduce the hotspot phenomenon sufficiently. In addition, or alternatively a mild anti-glare structure can be applied, as illustrated in FIG. 13.

Such an anti-glare structure will have a negative effect on the ability of the screen to focus the light. The structure therefore can be optimized to achieve an acceptable compromise between the size of the focus spot (e.g. preferably the diameter of the spot is $<1/5^{th}$ of the size of the micro-lenses or $>1/10$ of the size of the micro-lenses) and a sufficient spread of the front surface reflection (preferably the intensity of the surface reflection is $<1/4^{th}$ of the intensity of the reflection by the micro-lens mirrors or for example $>1/20^{th}$ of the intensity of the reflection by the micro-lens mirrors or >zero intensity or as low as possible).

A positive effect of this anti-glare structure is that it also yields some mixing of the outgoing light. This will reduce the sensitivity to small imperfections of the screen such as pinholes in the mirror coating applied on the micro-lenses. Further this will help to reduce speckle.

The invention claimed is:

1. A reflective projection display screen for use with one or more projectors, the projection display screen having a screen area covered with a patterned layer stack customized to accept projector light from only one projection direction per projector, the projection display screen comprising:
    a first retarder, a micro-lens array of mirrors for focusing light from at least one projector at focus positions where the light can escape from the patterned layer stack,
    a layer defining the patterned layer stack that is different at the focus positions than in the remainder of the screen area, and comprising a polarizing layer at least in said remainder of the screen area, wherein the patterned layer stack accepts only light coming from one projector direction per projector, whereas reflection of any light coming from another direction is reduced or suppressed, wherein the layer defining the patterned layer stack is a photo-alignment layer, which when exposed to polarized UV or parts of the visible spectrum light having a polarization direction, the alignment direction of the photoalignment layer is driven by the polarization direction of the UV or parts of the visible spectrum light to which the photoalignment layer is exposed.

2. The projection display screen according to claim 1, further comprising a second retarder formed on the photo-alignment layer.

3. The projection display screen according to claim 2, wherein the second retarder is a broadband half-wave retarder.

4. The projection display screen according to claim 3, wherein the broadband half-wave retarder provides a constant retardation over substantially the entire visible light wavelength range (420 nm-680 nm) or at least for all the wavelengths emitted by the projector.

5. The projection display screen according to claim 2, wherein two or more projectors project onto the same position on the projection screen and the projection screen at said position is configured to accept projector light only from projection directions of the one or more projectors.

6. The projection display screen according to claim 5, wherein the two or more projectors are a first and a second projector side by side that project with a certain overlap zone on the projection screen wherein a projected image gradually transitions from an image projected by the first projector to the image projected by the second projector in an edge blended projector setup, and the projection screen is configured to accept projector light only from projection directions of the first and the second projector.

7. The projection display screen according to claim 5, wherein the two or more projectors are a first and a second projector side by side that project overlapped images to increase the brightness of the image on each projection screen, and the projection screen is configured to accept projector light only from projection directions of the first and the second projector.

8. The projection display screen according to claim 7, wherein the two or more projectors are a first and a second projector side by side that project onto the projection screen a portion of the information of the image.

9. The projection display screen according to claim 8, wherein the first projector is adapted to project a background information and the second projector is adapted to project a foreground information or the second projector is adapted to project other additional information such as subtitles, highlights, or images of increased luminance for any reason.

10. The projection display screen according to claim 5, wherein the two or more projectors are a first and a second projector side by side that project onto the projection screen overlapped images in order to generate a stereoscopic projection, and the projection screen is configured to accept projector light only from projection directions of the first and the second projector.

11. The projection display screen according to claim 10, wherein the first projector is adapted to project the image with the left-eye information and the second projector is adapted to project the image with the right-eye information.

12. A plurality of projection display screens according to claim 5, and a plurality of projector units, each of the plurality of projector units being a multiple of projectors whereby the multiple projectors project onto the same position on each projection screen and each projection screen is configured to accept projector light only from projection directions of the multiple projectors.

13. The plurality of projection display screens according to claim 12, wherein for each projection screen, each projector unit has a first and a second projector side by side that project with a certain overlap zone on the projection screen wherein a projected image gradually transitions from an image projected by the first projector to the image projected by the second projector in an edge blended projector setup, and each projection screen is configured to accept projector light only from projection directions of the first and the second projector.

14. The plurality of projection display screens according to claim 12, wherein for each projection screen, each projector unit has a first and a second projector side by side that project overlapped images to increase the brightness of the image on each projection screen or on one or more of the projection screens, and each projection screen is configured to accept projector light only from projection directions of the first and the second projector.

15. The plurality of projection display screens according to claim 12, wherein for each projection screen, each projector unit has a first and a second projector side by side that project for each projection screen overlapped images in order to generate a stereoscopic projection, and each projection screen is configured to accept projector light only from projection directions of the first and the second projector.

16. The plurality of projection display screens according to claim 15, wherein the first projector is adapted to project the image with the left-eye information and the second projector is adapted to project the image with the right-eye information.

17. The plurality of projection display screens according to claim 12, wherein for each projection screen, each projector unit has a first and a second projector side by side that project for each projection screen a portion of the information of the image.

18. The plurality of projection display screens according to claim 17, wherein the first projector is adapted to project a background information and the second projector is adapted to project a foreground information or the second projector can project other additional information such as subtitles, highlights, or images of increased luminance for any reason.

19. The plurality of projection display screens according to claim 12, wherein the second projection display screen is between the first and third projection display screens.

20. The plurality of projection display screens according to claim 19, further comprising a first projector arranged to project first images on the first projection display screen and a second projector arranged to project second images on the projection display second screen and a third projector arranged to project third images on the first projection display screen.

21. The projection display screen according to claim 1, and one or more projectors, each projection display screen being configured to accept projector light only from a projector direction of corresponding projectors dedicated to each projection display screen.

22. A method of producing a projection display screen having a screen area and a substrate, the projection display screen comprising: a first retarder, a micro-lens array of mirrors on the substrate for focusing light from a projector at focus positions where the light can escape from the substrate through a patterned layer structure, the method comprising the steps of:
    covering the substrate with a photosensitive layer;
    exposing the photosensitive layer to light from a light source, the light having an angle of incidence on the substrate identical to the angle of incidence of projector light projected from a projector onto that position on the screen, exposure of the photosensitive layer and subsequent processing steps defining a layer structure that is different at the focus positions, than in the remainder of the screen area;
    wherein the photosensitive layer is a photo alignment layer and subsequent processing includes the creation of a patterned polarizing layer wherein the polarization direction of the patterned polarizing layer is defined by the photo-alignment layer, or
    wherein the photosensitive layer is a photo alignment layer and subsequent processing includes the creation of a patterned broadband half-wave retarder wherein the retardation of the patterned half wave retarder layer for the incoming polarization direction is defined by the photo-alignment layer, and
    wherein the photo-alignment layer is exposed to polarized UV or parts of the visible spectrum light having a polarization direction, the alignment direction of the photoalignment layer is driven by the polarization direction of the UV or parts of the visible spectrum light to which the photoalignment layer is exposed.

23. A reflective projection display screen having a screen area covered with a patterned layer stack customized to accept projector light from only one projection direction per projector, the projection display screen comprising:
    a first retarder, a micro-lens array of mirrors for focusing light from at least one projector at focus positions where the light can escape from the patterned layer stack,
    a layer defining the patterned layer stack that is different at the focus positions than in the remainder of the screen area, and comprising a polarizing layer at least in said remainder of the screen area, wherein the patterned layer stack accepts only light coming from one projector direction per projector, whereas reflection of any light coming from another direction is reduced or suppressed, wherein the layer defining the patterned layer stack is a photo-alignment layer,
    wherein two or more projectors project onto the same position on the projection display screen and the projection display screen at said position is configured to accept projector light only from projection directions of the two or more projectors, wherein a second retarder is formed on the photo-alignment layer.

* * * * *